(12) United States Patent
Pomeranz et al.

(10) Patent No.: US 10,274,809 B1
(45) Date of Patent: Apr. 30, 2019

(54) MULTIWAVELENGTH LASER SOURCE

(71) Applicant: BAE SYSTEMS Information and Electronic Systems Integration Inc., Nashua, NH (US)

(72) Inventors: Leonard A. Pomeranz, Hollis, NH (US); Peter A. Budni, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/816,151

(22) Filed: Nov. 17, 2017

(51) Int. Cl.
*G02F 1/39* (2006.01)
*G02F 1/35* (2006.01)
*H01S 3/23* (2006.01)
*H01S 3/067* (2006.01)

(52) U.S. Cl.
CPC ............. *G02F 1/39* (2013.01); *G02F 1/3534* (2013.01); *H01S 3/067* (2013.01); *H01S 3/2391* (2013.01); *G02F 2001/392* (2013.01)

(58) Field of Classification Search
CPC .... G02F 1/3534; G02F 1/39; G02F 2001/392; H01S 3/067; H01S 3/2391
See application file for complete search history.

(56) References Cited

U.S. PATENT DOCUMENTS

| | | | | |
|---|---|---|---|---|
| 5,386,314 A | * | 1/1995 | Jopson | G02F 1/3536 359/326 |
| 5,504,610 A | * | 4/1996 | Bulow | G02F 1/3538 398/154 |
| 7,145,715 B2 | * | 12/2006 | Chraplyvy | G02F 1/353 359/330 |
| 7,529,281 B2 | * | 5/2009 | Leonardo | G02F 1/353 372/21 |
| 7,889,422 B2 | * | 2/2011 | Furuya | G09G 3/002 359/326 |
| 8,411,352 B2 | * | 4/2013 | Starodoumov | H01S 3/06754 359/326 |

(Continued)

OTHER PUBLICATIONS

Wall, K. F., et al., "Titanium Sapphire Lasers", The Lincoln Laboratory Journal, 1990, pp. 447-462, vol. 3, No. 3, 16 pages.

*Primary Examiner* — Daniel Petkovsek
(74) *Attorney, Agent, or Firm* — Finch & Maloney, PLLC; Scott J. Asmus

(57) ABSTRACT

Techniques are provided for a multiwavelength laser source and a method of driving the multiwavelength laser source. The multiwavelength laser source includes: a plurality of seed lasers to generate a corresponding plurality of seed beams having a corresponding plurality of distinct seed wavelengths; a laser combiner to receive and combine the seed beams into a single first beam; an optical amplifier to amplify the first beam; and a single fixed nonlinear converter to convert and output the amplified first beam as a multiwavelength second beam including the seed wavelengths and one or more new wavelengths distinct from and generated from the seed wavelengths. In some embodiments, the nonlinear converter is an optical parametric oscillator (OPO) or an optical parametric generator (OPG). In some other embodiments, the nonlinear converter is a sum frequency generator (SFG), a difference frequency generator (DFG), or an optical parametric amplifier (OPA).

21 Claims, 18 Drawing Sheets

(56) References Cited

U.S. PATENT DOCUMENTS 8,665,918 B2 * 3/2014 Creeden ............... G02F 1/3558
372/21
2008/0075130 A1 * 3/2008 Mizuuchi ................ G02F 1/37
372/6

* cited by examiner

MULTIWAVELENGTH LASER SOURCE

BACKGROUND

Direct emission from laser sources generating multiwavelength output in the optical spectrum is both difficult and cumbersome to achieve, requiring multiple lasers or wavelength converters. Multiwavelength spectral output can be achieved through use of an optical parametric oscillator (OPO) pumped by a laser source. Multiwavelength tunable output can be achieved by varying the spectral output of the laser source along the phase-matching OPO tuning curve or by fixing the laser spectral output of the laser source and mechanically or electro-optically tuning the OPO crystal. Unfortunately, not all nonlinear optical crystals lend themselves to electro-optical tuning, and the prospect of using mechanical means creates complex beam steering control methods.

BRIEF DESCRIPTION OF THE DRAWINGS

Features of embodiments of the claimed subject matter will become apparent as the following Detailed Description proceeds, and upon reference to the Drawings, wherein like numerals depict like parts.

Figure 1:
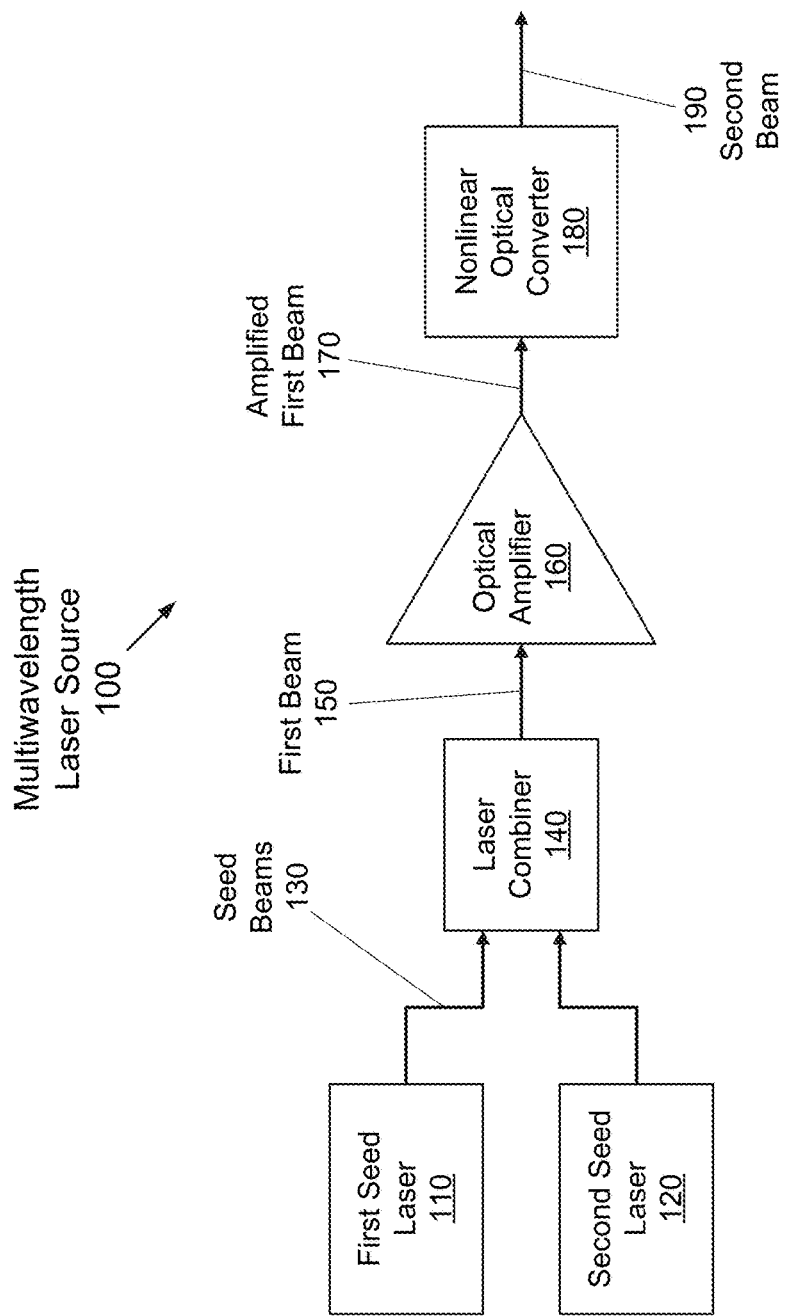
FIG. 1 illustrates an example multiwavelength laser source, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

A multiwavelength laser source is provided. In an embodiment, the multiwavelength laser source has a variable spectral output using a fixed OPO crystal and exploits the tuning capability of the OPO by driving the crystal with separate spectral inputs that are combined in a common pump laser stage (such as a common fiber or free space pump laser stage). The pump laser is composed of multiple seeds, all combined (e.g., fiber or free space combined) into a common simple beamline. Power scaling is achieved by adding amplifier stages that amplify all of the various spectral inputs from the seed sources in the common path that drives the OPO. The multiwavelength laser source provides variable spectral output on a pulse to pulse basis by using a fixed OPO crystal and by varying the laser pump spectral output on a pulse to pulse basis. This achieves interleaved multi-spectral output extending the frequency range from the hertz (Hz) to the megahertz (MHz) range limited only by the nonlinear optical converter (in this case, the OPO) and its phase-matching properties.

General Overview

A multiwavelength laser source provides multiple wavelengths of laser output. Such a laser source is useful in many applications such as infrared countermeasure (IRCM), spectroscopy, free-space optical communication (such as free-space secure communications), lidar, and targeting (such as military targeting), to name a few. There is a need for simultaneous multiband output from a simple architecture, in contrast to techniques that use multiple converters, power dividers, and combiners. Such other techniques provide insufficient spectral coverage and have cumbersome architectures. Further, such techniques require multiple stages to achieve the same output and the input laser power must be very high to drive the multiple stages. In addition, techniques relying on tuning (e.g., the OPO crystal or gain material) can be slow or add other undesirable burdens.

Thus, and in accordance with an embodiment of the present disclosure, a multiwavelength laser source capable of generating one or more new wavelengths from a single laser beam (having two or more pump wavelengths) and a single OPO (or other nonlinear optical converter) is provided. The multiwavelength laser source provides scalable multi-spectral pump laser input to drive a single OPO converter, producing controlled multiwavelength output by temporal drive parameters. The multiwavelength laser source has a single beam line and single OPO producing multiline output, pulse interleaved capability, fiber confined architecture, temporal flexibility, and broad near-continuum spectral coverage. The OPO is fixed to avoid, for example, having to make mechanical, temperature, or applied electric field adjustments to the nonlinear crystals in the OPO.

In accordance with some embodiments of the present disclosure, a multiwavelength laser source system is provided. The system includes a pump laser input having more than one (e.g., N>1) seed laser. Each seed laser delivers a different wavelength. The input can vary in temporal mode (e.g., multiplexed, sequenced in time, interleaved, or simultaneous, to name a few), all amplified in a common amplifier system (such as a common amplifier medium configured to amplify all of the different pump wavelengths). The amplified pump input is in turn used to drive a nonlinear process—such as an OPO, an optical parametric generator (OPG), a sum-frequency generator (SFG), a difference-frequency generator (DFG), an optical parametric amplifier (OPA), or the like—that uses a portion of the amplified beamline to generate one or more new wavelengths (e.g., wavelengths considerably different from the input wavelengths) through the nonlinear process. Accordingly, multiwavelength laser light including the new wavelengths and the original (input) wavelengths is output as a single beam by the multiwavelength laser source. The output beam thus has increased spectral coverage compared to the component input beams. Depending on the input beam wavelengths and the type of nonlinear process, the output beam can acquire much different spectral locations than those of the input pump, including locations that are otherwise difficult to generate.

Architecture and Methodology

FIG. 1 illustrates an example multiwavelength laser source 100 according to an embodiment of the present disclosure. In the multiwavelength laser source 100, the output beams from two distinct wavelength seed lasers (first seed laser 110 and second seed laser 120) are directed (e.g., in free space, by fiber channel, or the like) as seed beams 130 to laser combiner 140, where they are combined (e.g., using free space optics, a fiber-coupled laser combiner, or the like) to produce a single first beam 150 that includes the distinct seed wavelengths. The seed lasers can be, for example, continuous wave or pulsed in their temporal nature. The laser combiner 140 can be configured (for example, using dichroic optics) to combine beams of the seed wavelengths into a single beam (having both seed wavelengths) and output that beam as first beam 150. In further detail, the laser combiner 140 can combine the different seed beams 130 (having different seed wavelengths) by, for example, in a fiber component, using a fused fiber optic coupler, a fiber Bragg grating, or the like, or in a free space component using dichroic thin film filters, or other components such as prisms, surface gratings, or volume Bragg gratings, to name a few.

The first beam 150 (more particularly, each of the wavelengths making up the first beam 150) is amplified by an optical amplifier 160 (such as a common amplifying medium configured to amplify each of the seed wavelengths) and output along a fiber channel as an amplified first beam 170. The amplified first beam 170 is used to drive a fixed nonlinear optical converter 180 (such as an OPO, OPG, SFG, DFG, OPA, or the like) to produce a second beam 190. For example, an OPO includes one or more nonlinear optical gain crystals as well as cavity mirrors (e.g., a resonator) surrounding the crystal(s). The OPG, SFG, DFG, and OPA are similar, but do not have a resonator, only the crystal(s). The pump radiation for the nonlinear optical converter 180 (seed lasers 110 and 120, and amplifier 160—in concert) can be configured to pump the nonlinear optical converter 180 in multiple temporal modes. For example, the amplified seed lasers 110 and 120 can drive the nonlinear optical converter 180 by being addressed in: sequence, interleaved, simultaneously, burst modes, or discretely, to name some of the techniques.

Figure 2:
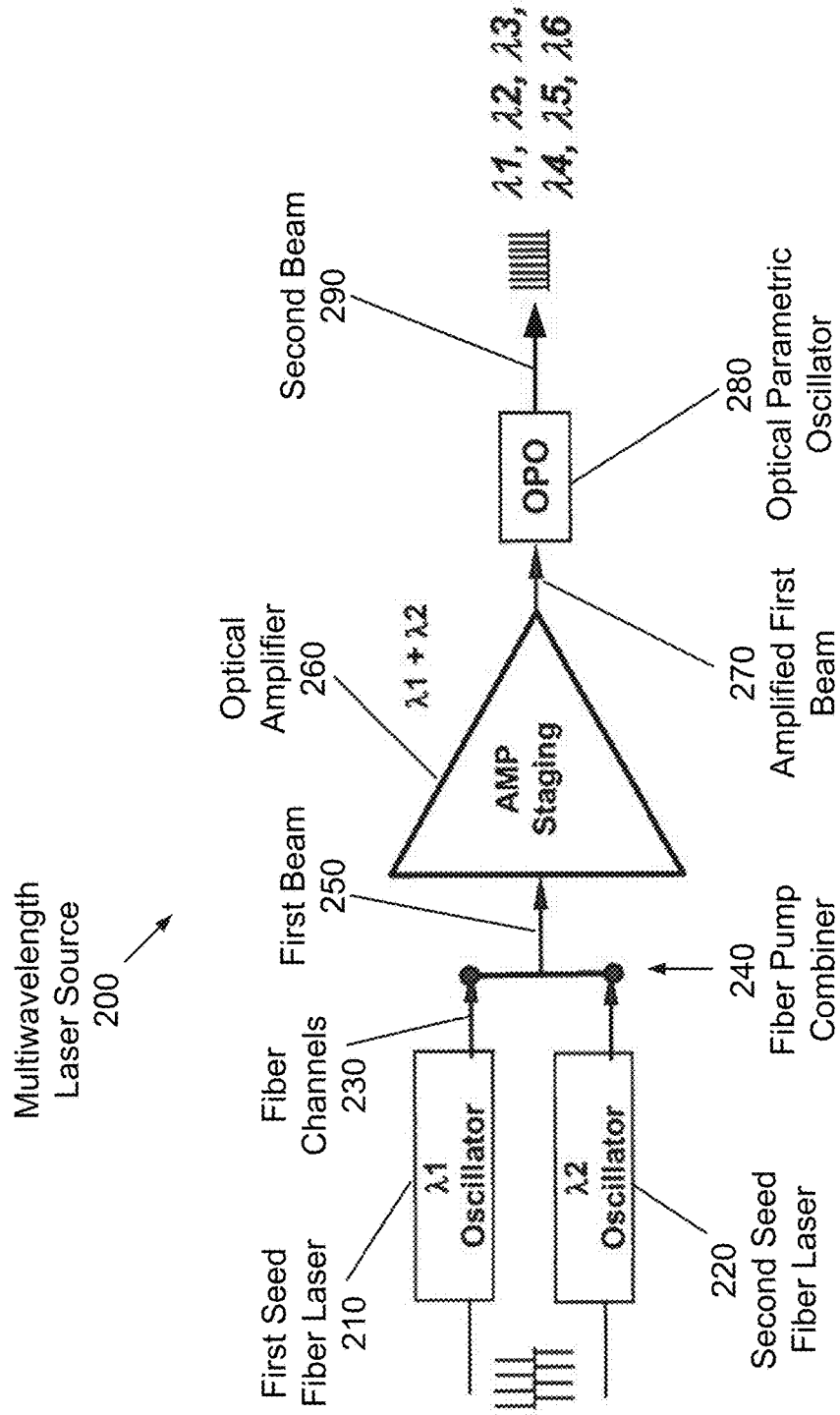
FIG. 2 illustrates an example multiwavelength laser source, according to another embodiment of the present disclosure.

FIG. 2 illustrates an example multiwavelength laser source 200 according to another embodiment of the present disclosure. In the multiwavelength laser source 200, two distinct wavelength seed lasers are combined, amplified, and drive a fixed OPO crystal. The pump radiation for the OPO (seed lasers and amplifiers—in concert) can be configured to pump the OPO in multiple temporal modes. By way of non-limiting example, the amplified seed lasers can drive the OPO by being addressed in: sequence, interleaved, simultaneously, burst modes, or discretely. The different spectral outputs of the seeds are combined in a common beam path and then amplified to drive the OPO. Put another way, FIG. 2 is a conceptual view of a multiwavelength laser composed of multiple amplified seed lasers driving one OPO crystal. The seeds provide two different wavelengths and the OPO provides an additional four wavelengths. Simultaneous or interleaved seed inputs generate simultaneous multi-spectral output. FIG. 2 illustrates a two-channel device, but in other embodiments, N channels (N>2) are possible with the addition of more seed sources (oscillators).

In further detail, in the multiwavelength laser source 200, the output beams from two distinct wavelength seed fiber lasers (first seed fiber laser 210 and second seed fiber laser 220) are directed to fiber channels 230 and combined at a fiber pump combiner 240 (for example, using a fiber-coupled laser combiner) to produce a first beam 250 output by a fiber channel. The fiber pump combiner 240 can be configured (for example, using dichroic optics) to combine beams of the distinct wavelengths of the seed fiber lasers 210 and 220 into a single beam (having both seed wavelengths) and output that beam as first beam 250. The first beam 250 (more particularly, each of the wavelengths making up the first beam 250) is amplified by an optical amplifier 260 (such as one or more amplifier stages, e.g., doped fiber amplifiers including erbium-doped fiber amplifiers (EDFAs), ytterbium-doped fiber amplifiers (YDFAs), and the like, each configured to amplify one or more of the input wavelengths) and output along a fiber channel as an amplified first beam 270. The amplified first beam 270 is used to drive a fixed OPO crystal 280 to produce a second beam 290. The pump radiation for the OPO 280 (seed lasers 210 and 220, and amplifiers 260—in concert) can be configured to pump the OPO 280 in multiple temporal modes. For example, the amplified seed lasers 210 and 220 can drive the OPO 280 by being addressed in: sequence, interleaved, simultaneously, burst modes, or discretely, to name some of the techniques.

In still further detail, seeds 210 and 220 provide two corresponding (and distinct) wavelengths $\lambda 1$ and $\lambda 2$ while OPO 280 provides an additional four wavelengths $\lambda 3$ and $\lambda 4$ (corresponding to input wavelength $\lambda 1$) and $\lambda 5$ and $\lambda 6$ (corresponding to input wavelength $\lambda 2$). For example, if $\lambda 1$ is the input (pump) wavelength to the OPO 280, then $\lambda 3$ is the signal wavelength and $\lambda 4$ is the idler wavelength output from the OPO 280 (in addition to residual pump waves of the $\lambda 1$ wavelength not converted to the signal or idler waves). In a similar fashion, if $\lambda 2$ is the input (pump) wavelength to the OPO 280, then $\lambda 5$ is the signal wavelength and $\lambda 6$ is the idler wavelength output from the OPO 280 (in addition to residual pump waves of the $\lambda 2$ wavelength not converted to the signal or idler waves). Given the particular setting (e.g., tuning) of the OPO, distinct wavelengths $\lambda 1$ and $\lambda 2$ can be chosen such that the generated signal and idler wavelengths $\lambda 3$, $\lambda 4$, $\lambda 5$, and $\lambda 6$ are distinct from each other and from the input wavelengths $\lambda 1$ and $\lambda 2$.

Further, distinct wavelengths λ1 and λ2 can be chosen such that the generated signal and idler wavelengths λ3, λ4, λ5, and λ6 in combination with the input wavelengths λ1 and λ2 provide multi-spectral light with good (e.g., representative, such as evenly distributed) coverage between the shortest wavelength (e.g., shortest input wavelength) and the longest wavelength (e.g., longest idler wavelength). Such light is useful in applications where broad spectrum light coverage (such as white light for the visible wavelength bands) is desired.

Figure 3:
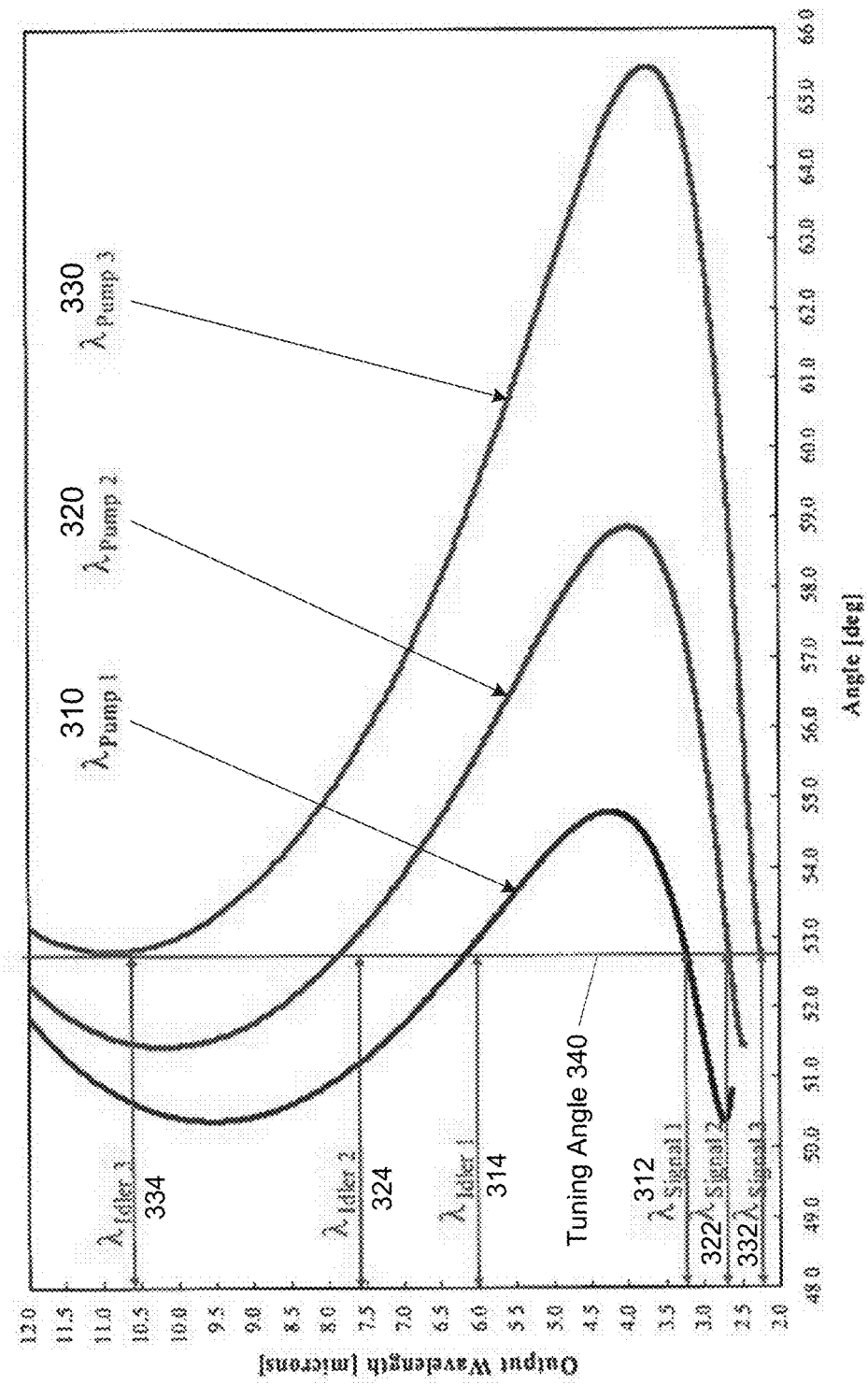
FIG. 3 illustrates example phase-matching curves versus OPO crystal angle for three distinct pump wavelengths for a zinc germanium phosphide (ZGP) nonlinear crystal OPO, according to an embodiment of the present disclosure.

FIG. 3 illustrates example phase-matching curves versus OPO crystal angle for three distinct pump wavelengths for a zinc germanium phosphide (ZGP) nonlinear crystal OPO according to an embodiment of the present disclosure. It is shown that for a fixed propagation angle the three distinct wavelengths produce three new pairs of spectral lines. Put another way, FIG. 3 shows three ZGP phase-matching curves for three pump wavelengths (from three amplified seed sources) and a fixed crystal angle. Each pump wavelength produces two wavelengths from the OPO (a signal wavelength and an idler wavelength). In nonlinear optical conversion, the signal frequency plus the idler frequency equals the pump frequency (due to conservation of energy), with the signal wavelength being the shorter of the two (signal and idler) wavelengths. With the addition of N seeds (for sufficiently large N) a continuum of radiation is possible.

In further detail, in FIG. 3, the OPO is driven with an input beam having three seeds 310, 320, and 330 (e.g., fiber lasers), corresponding to approximate wavelengths of 2.1 μm (Pump 1—310), 2.0 μm (Pump 2—320), and 1.85 μm (Pump 3—330). The vertical line represents the tuning angle 340, in this case fixed at approximately 52.75°. Accordingly, the OPO is tuned to convert some of the first seed 310 (at 2.1 μm) to a signal beam 312 (at 3.25 μm) and an idler beam 314 (at 6.0 μm), the second seed 320 (at 2.0 μm) to a signal beam 322 (at 2.7 μm) and an idler beam 324 (at 7.5 μm), and the third seed 330 (at 1.85 μm) to a signal beam 332 (at 2.2 μm) and an idler beam 334 (at 10.5 μm). The three seeds used in the embodiment of FIG. 3 could be amplified, for example, by a common amplifier, such as a thulium-doped fiber amplifier. For instance, the amplifier could be energized by semiconductor diode laser pump sources.

Figure 4:
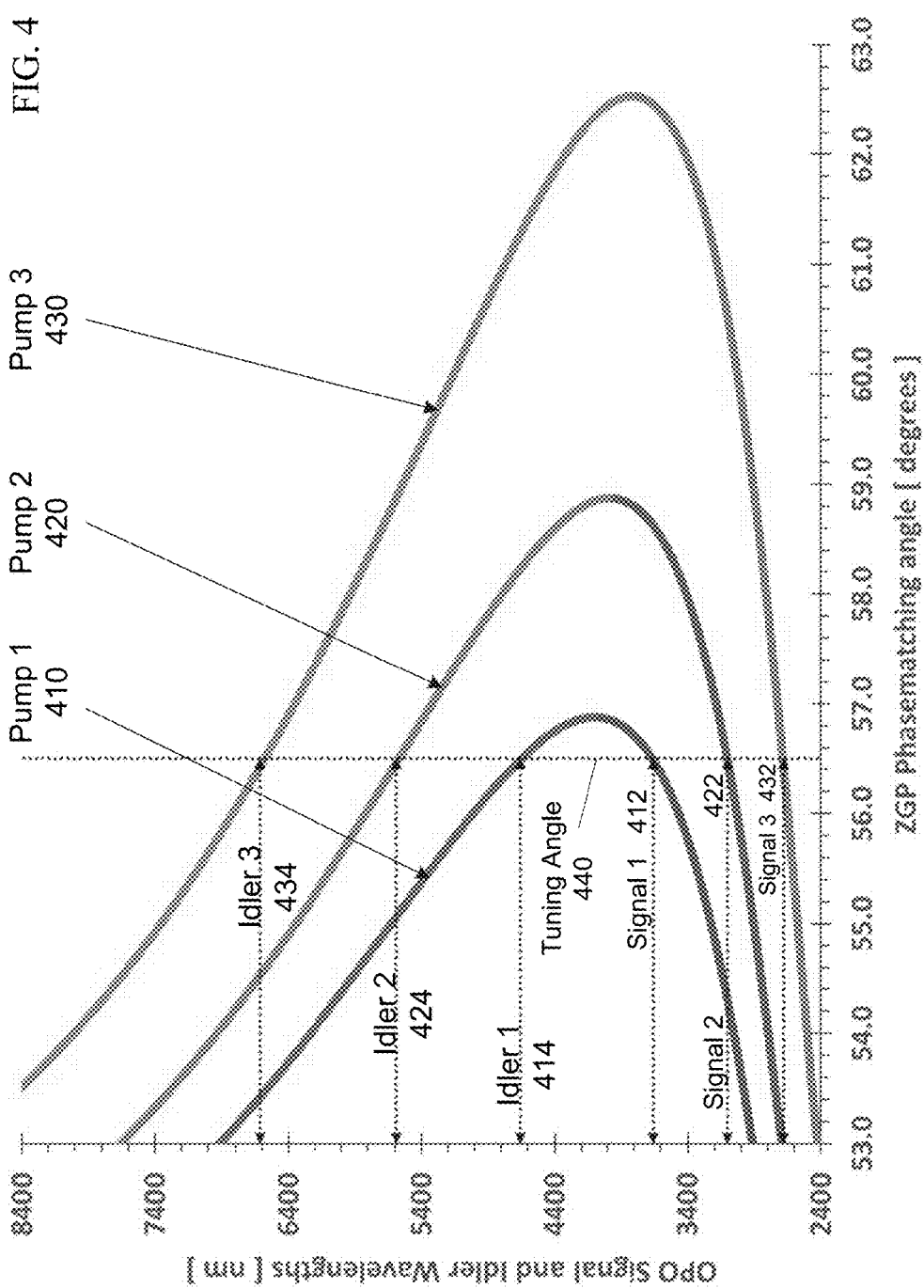
FIG. 4 illustrates example phase-matching curves versus OPO crystal angle for three distinct pump wavelengths for a ZGP nonlinear crystal OPO, according to another embodiment of the present disclosure.

FIG. 4 illustrates example phase-matching curves versus OPO crystal angle for three distinct pump wavelengths for a ZGP nonlinear crystal OPO, according to another embodiment of the present disclosure. The phase-matching curves of FIG. 4 are similar to those of FIG. 3, except they are based on a tighter portion of input beams. Such a tighter set of beams can improve upon the configuration of FIG. 3 in a number of ways. For example, the tighter set of beams used in FIG. 4 can avoid generating idler wavelengths over 8 μm, which helps reduce ZGP loss than can take place for generated wavelengths over 8 μm. In addition, the tighter set of beams used in FIG. 4 can make it easier for a single or common amplifier to amplify all three input seeds.

In further detail, in FIG. 4, the OPO is driven with an input beam having three seeds 410, 420, and 430 (e.g., fiber lasers), corresponding to wavelengths of 2.05 μm (Pump 1—410), 1.993 μm (Pump 2—420), and 1.908 μm (Pump 3—430). The vertical line represents the tuning angle 440, in this case fixed at 56.5°. Accordingly, the OPO is tuned to convert some of the first seed 410 (at 2.05 μm) to a signal beam 412 (at 3.66 μm) and an idler beam 414 (at 4.661 μm), the second seed 420 (at 1.993 μm) to a signal beam 422 (at 3.098 μm) and an idler beam 424 (at 5.587 μm), and the third seed 430 (at 1.908 μm) to a signal beam 432 (at 2.681 μm) and an idler beam 434 (at 6.617 μm). The three seeds used in the embodiment of FIG. 4 could be amplified, for example, by a common amplifier, such as a thulium-doped fiber amplifier. For instance, the amplifier could be energized by semiconductor diode laser pump sources.

While the crystals (such as birefringent crystals) in nonlinear devices such as OPOs can be tuned by various techniques (e.g., adjusting their tuning angle electro-optically, mechanically, through poling, or by temperature, to name a few), and while different tuning angles or other tuning mechanisms produce different sets of signal and idler beams for each input seed (e.g., a different phase-matching curve for each input wavelength), according to various embodiments of the present disclosure, the OPO crystal is kept fixed (e.g., not re-tuned) while the combination of input seeds (number and wavelength distribution) is varied to produce the desired output spectrum through the OPO (or other nonlinear optical converter).

For instance, with more input seeds, more signal and idler beams are produced in an embodiment such as those illustrated in FIGS. 1-2, so if it is desired to produce near continuum coverage (e.g., lessen or minimize the gap between input and generated wavelengths), sufficient input beams should be selected (in number and in wavelength distribution) to produce input, signal, and idler wavelengths having acceptable separations in wavelength distribution. In FIG. 3, for example, the input and generated wavelengths, in order, are 1.85 μm, 2.0 μm, 2.1 μm, 2.2 μm, 2.7 μm, 3.25 μm, 6.0 μm, 7.5 μm, and 10.5 μm, which provides good (e.g., near continuum) coverage in most of the short-wavelength infrared region (e.g., 1.4-3 μm) as well as respectable coverage in the mid-wavelength (e.g., 3-8 μm) and long-wavelength (e.g., 8-15 μm) infrared regions. Further, in FIG. 4, the input and generated wavelengths, in order, are 1.908 μm, 1.993 μm, 2.050 μm, 2.681 μm, 3.098 μm, 3.660 μm, 4.661 μm, 5.587 μm, and 6.617 μm, which provides good (e.g., near continuum) coverage in most of the short-wavelength infrared region (e.g., 1.4-3 μm) and mid-wavelength (e.g., 3-8 μm) infrared regions. Some applications can benefit from a nearly continuous spectral (very spectrally broad) source, such as a multiwavelength laser source according to one or more embodiments of the present disclosure. For example, in some spectroscopic measurements, it would be useful to have a broad light source (such as a multiwavelength laser source) that is much brighter than a lamp.

More wavelengths are possible with the addition of more seed lasers. While FIGS. 1-2 show two-channel devices, in some embodiments, N channels (for N>2) are provided in an interleaved or even simultaneous output format and limited only by material power handling capability and pump laser component spectral density. Thus, it is possible to achieve a near continuum of spectral emission from a single OPO crystal and additional amplified seed lasers.

In some embodiments, other mid-IR OPO materials are used, such as orientation-patterned gallium arsenide (OP-GaAs), silver gallium sulfide ($AgGaS_2$, or AGS), or the like. In addition, some embodiments use other fiber based pump laser sources such as ytterbium (Yb), erbium (Er), neodymium (Nd), or similar, in all spectral regions supported by OPO materials using birefringent and quasi phase-matching techniques. In example embodiments of the present disclosure, the OPO materials include potassium titanyl phosphate ($KTiOPO_4$, or KTP), potassium titanyl arsenate ($KTiOAsO_4$, or KTA), periodically poled (PP) lithium niobate ($LiNbO_3$, or PPLN), periodically poled KTP (PPKTP), periodically poled stoichiometric lithium tantalite ($LiTaO_3$, or PPSLT), and barium borate (e.g., $BaB_2O_4$ or $Ba(BO_2)_2$, such as β-barium borate or BBO), to name a few.

According to some embodiments, the materials (e.g., OPO materials) and associated optical coatings used support the wavelength range of the seeds and the newly generated signal and idler wavelengths, as would be apparent in light of the present disclosure. For example, in one or more embodiments, the amplifying medium is also a wave guiding structure to maintain all seeds overlapped as they propagate (for example, glass fibers doped with a rare earth element that acts as the gain medium). In some other embodiments, the seeds are modified by optical elements (e.g., lenses and mirrors) to ensure that propagation is kept collinear or nearly collinear with the other seeds. In one or more free space embodiments, the seeds are amplified by gain elements such as laser crystals or glasses, also doped with a rare earth or transition metal lasing element. The seeds can be sent, for example, through a single pass amplifier, a multi-pass amplifier, or via a regenerative method to be amplified.

According to various embodiments, in order to accommodate the widest selection of seeds, the amplifying medium has a broad gain bandwidth. A few examples of such broad amplifiers and their wavelength ranges that can be used in some embodiments are: titanium sapphire (e.g., $Ti^{3+}:Al_2O_3$, such as $Ti^{3+}$-doped $Al_2O_3$), 0.7-1.1 microns; ytterbium (e.g., $Yb^{3+}$, such as $Yb^{3+}$-doped or $Yb_2O_3$-doped) silicate or phosphate glass, 1.0-1.1 microns; erbium (e.g., $Er^{3+}$, such as $Er^{3+}$-doped) silicate or phosphate glass, 1.5-1.6 microns; Thulium ($Tm^{3+}$, such as $Tm^{3+}$-doped) silicate, phosphate, or germinate glass, 1.4-1.5 and 1.7-2.1 microns; fluoride fibers such as ZBLAN (e.g., $ZrF_4$—$BaF_2$—$LaF_3$—$AlF_3$—NaF) and $AlF_3$-based (e.g., $AlF_3$—$BaF_2$—$SrF_2$—$CaF_2$—$MgF_2$—$YF_3$) doped with, e.g., Er, holmium (Ho), or dysprosium (Dy) that operate at 2.7-3.0 microns; chromium (e.g., $Cr^{2+}$) doped in chalcogenides such as zinc sulfide (e.g., ZnS) and zinc selenide (e.g., ZnSe), 1.9-3.4 microns, and iron (e.g., Fe2+) doped in ZnS and ZnSe, 3.7-5.0 microns. Other embodiments may involve host materials with a narrower emission range but still broad enough to allow the amplification of multiple seeds.

The nonlinear conversion may be sensitive to the polarization of the incoming seed wavelengths and may require parallel or orthogonal polarization states for the seeds. One or more embodiments account for the polarization properties necessary to achieve phase matching in the nonlinear converter. For a fiber based amplifier, one or more embodiments maintain polarization of the seeds during amplification by using, for example, polarization-maintaining structures along the waveguide. In some embodiments, the amplifiers are powered by a separate pumping source, such as another laser. In one or more embodiments, the amplifier is designed to transfer the pumping source energy to the multiple seed inputs and not to generate its own amplified spontaneous emission (ASE), which can lead to unintended side effects such as inefficient behavior or possible damage.

In some fiber-based amplifier embodiments, Raman amplification can cause a nonlinear response of the fiber itself to the seed propagating through it. This can produce a shift of one or more of the seeds to new wavelengths. Accordingly, in some of these embodiments, the nonlinear optical crystal is capable of phase matching these new seed wavelengths.

In various embodiments, the material that generates the new wavelengths is driven by a nonlinear process, such as a second order or third order nonlinear process. The material can be a solid, a gas, a liquid, or even a plasma. For example, the third order processes can be Raman scattering, Brillouin scattering, four-wave mixing, or similar techniques. The second order processes can be parametric processes such as OPO, OPG, DFG, and SFG. In one or more embodiments, second harmonic generation can be considered a special case of SFG. The nonlinear material that generates the new wavelengths by the parametric process should be capable of phase matching with the given seed wavelengths, and according to one or more embodiments, is in a spectral region of high transmission (low absorption) for the seeds as well as for the generated wavelengths. In one or more embodiments, non-perfect phase matching generates additional wavelengths. In accordance with various embodiments, the nonlinear material is of adequate interaction length to allow for the spectral and angular extent of the seeds.

A few examples of both birefringent phase-matching and quasi phase-matching materials that would be used in some embodiments are: cadmium silicon phosphide (CSP, such as $CdSiP_2$), orientation-patterned gallium arsenide (OP-GaAs), zinc germanium phosphide (ZGP, such as $ZnGeP_2$), orientation-patterned gallium phosphide (OP-GaP), silver gallium selenide (AGSe, such as $AgGaSe_2$), periodically-polled lithium niobate (PPLN, such as PP $LiNbO_3$), periodically-poled potassium titanyl arsenate (PPKTA, such as PP $KTiOAsO_4$), periodically-poled potassium titanyl phosphate (PPKTP, such as PP $KTiOPO_4$), and silver gallium sulfide (AGS, such as $AgGaS_2$), to name a few.

According to various embodiments of the present disclosure, a set of seeds (e.g., seed lasers having associated wavelengths) is amplified in a common gain medium and then used to interact in a common nonlinear optical (NLO) material to generate new wavelengths. In some of these embodiments, the common gain material amplifies each of the seeds. In addition, in some of these embodiments, the NLO material phase matches and transmits all the amplified seeds and their corresponding signals and idlers. To this end, different amplifier materials amplify different ranges or sets of seed wavelengths and different NLO materials work with different ranges or sets of seed wavelengths and their corresponding signal and idler wavelengths. Further, the seeds can be amplified in mediums such as waveguide (e.g., fiber) or free space (e.g., bulk crystals).

Figure 5:
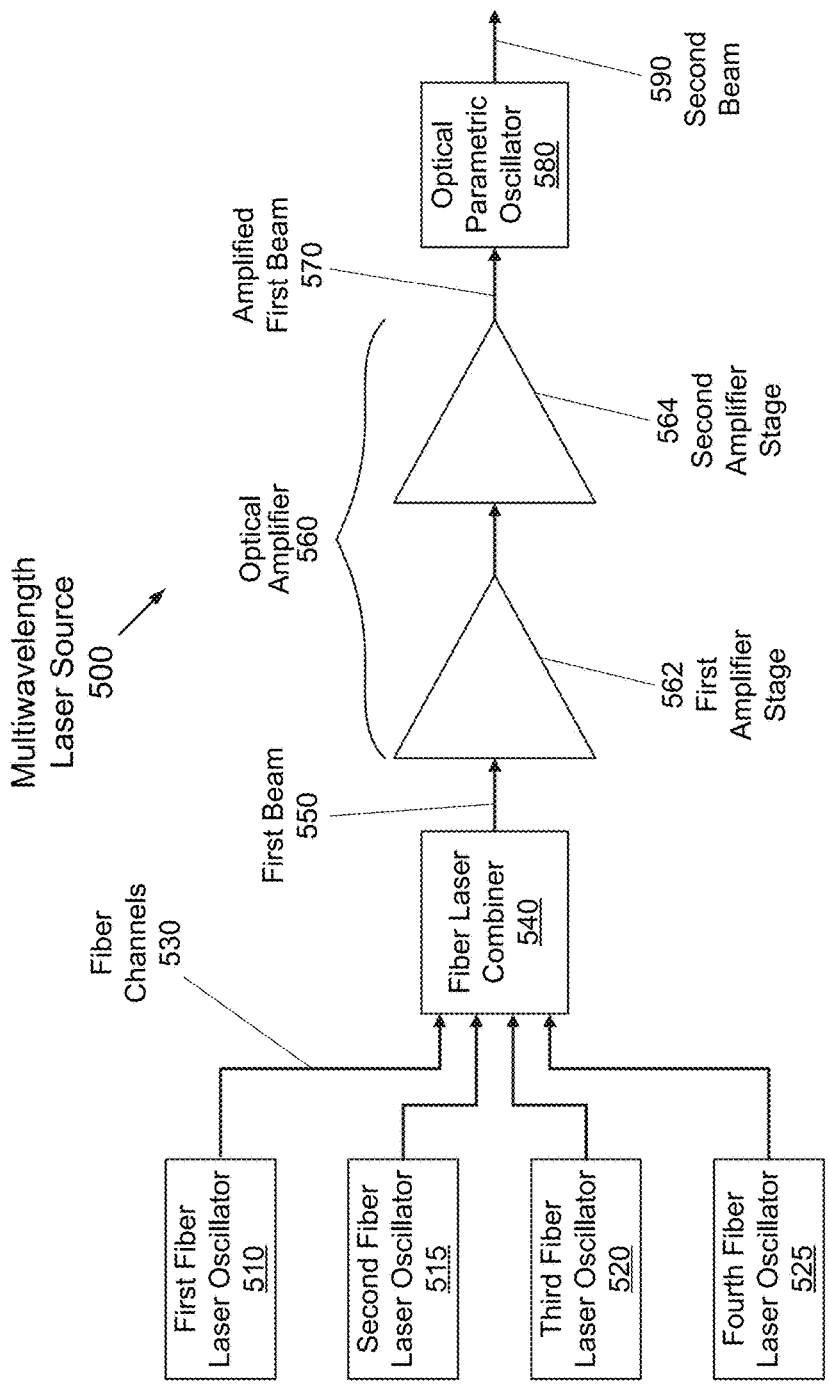
FIGS. 5-7 illustrate example multiwavelength laser sources, according to other embodiments of the present disclosure.
Figure 6:
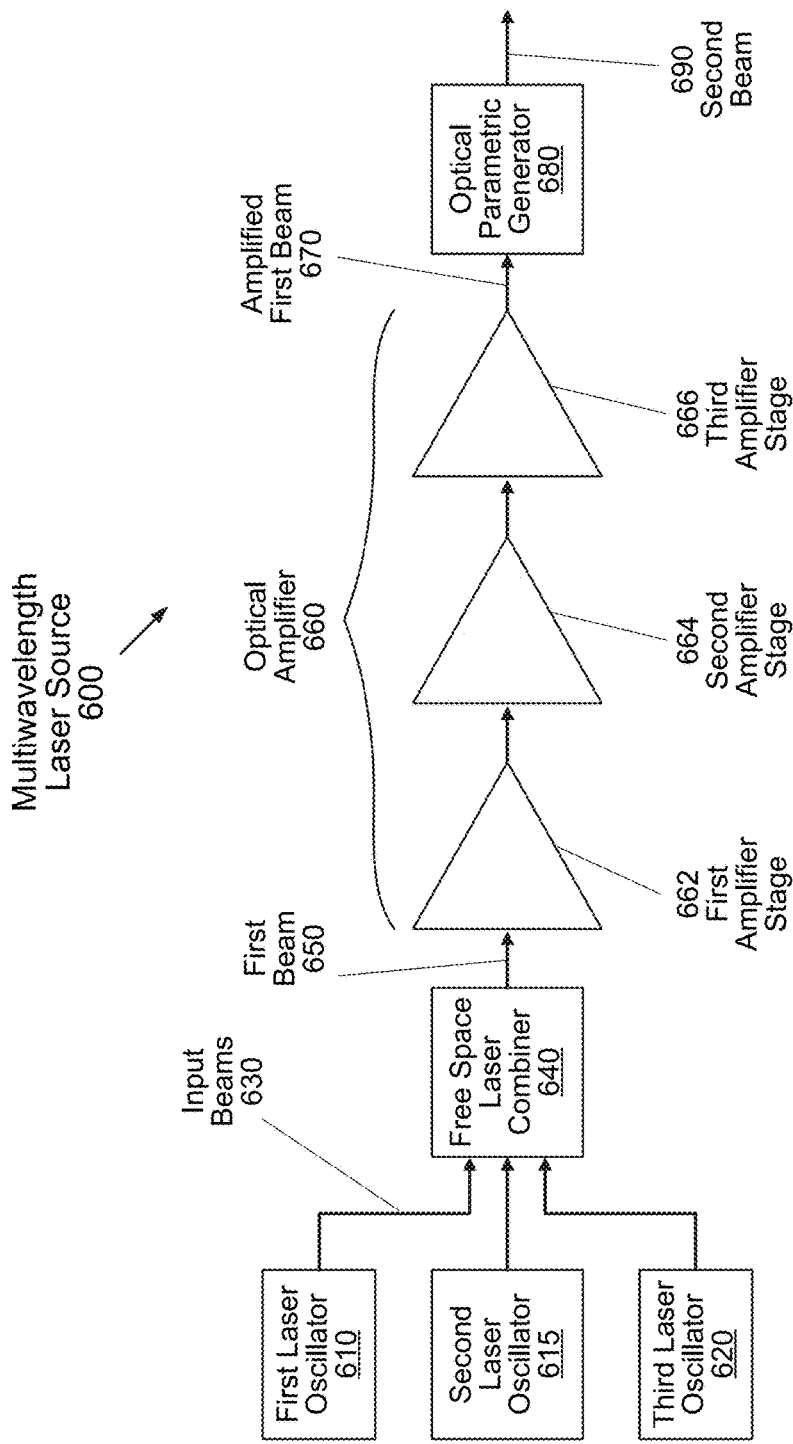
Figure 7:
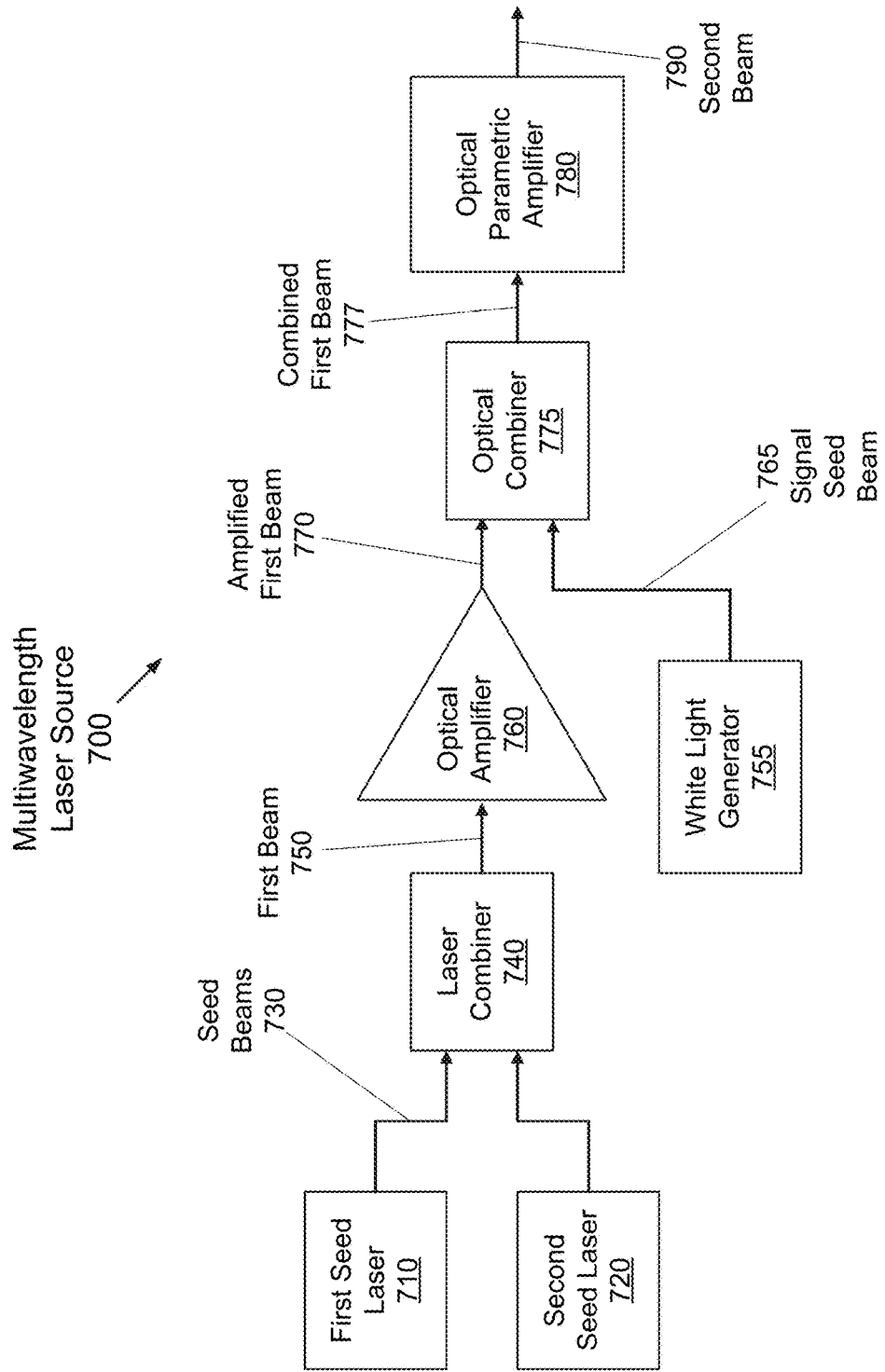

FIGS. 5-7 illustrate example multiwavelength laser sources 500, 600, and 700 according to other embodiments of the present disclosure. In FIG. 5, there are four fiber laser oscillators (seed lasers), namely first, second, third, and fourth fiber laser oscillators 510, 515, 520, and 525. Each of the laser oscillators 510, 515, 520, and 525 generates a seed laser beam of a different wavelength (e.g., a different infrared wavelength, such as a different wavelength between about 700 nm and about 3000 nm, or a different wavelength between about 900 nm and about 2100 nm). The seed laser beams are output along fiber channels 530 and combined at a fiber-coupled laser combiner 540 (e.g., a laser combiner, such as a fiber-coupled laser combiner, for example, a four-into-one fiber-coupled laser combiner configured to combine lasers having wavelengths of approximately those of the laser oscillators 510, 515, 520, and 525) to produce a first beam 550. The seed laser beams may be generated, for example, in pulses, having the same pulse repetition frequency (PRF), but offset from each other in time such that at the fiber laser combiner 540, they are combined into the first beam 550 so that the pulses from the different seed laser beams are interleaved and the first beam 550 has four times the PRF of each of the seed laser beams.

While it is desired for the first beam 550 to serve as a pump beam for an optical parametric oscillator (OPO) 580, the first beam 550 may lack sufficient power. Accordingly, an optical amplifier 560, including first and second amplifier stages 562 and 564 (e.g., doped fiber amplifiers, such as an erbium-doped fiber amplifier or EDFA, an ytterbium-doped fiber amplifier or YDFA, or the like), is provided to amplify the first beam into an amplified first beam 570. For example, each of the first and second amplifier stages 562 and 564 may be efficient at amplifying a different two of the four wavelengths represented in the first beam 550 such that, together, the first and second amplifier stages 562 and 564 amplify each of the four wavelengths (e.g., each of the four seed laser beams) to sufficient power levels to drive the OPO 580.

In another embodiment, each of the first and second amplifier stages 562 and 564 may be efficient at amplifying all four wavelengths of the first beam 550, but only to a certain level of amplification. Thus, first amplifier stage 562 may serve as a pre-amplifier to condition the first beam 550 for the second amplifier stage 564, which boosts the first beam 550 to a sufficient power to drive the OPO 580. In some embodiments, there are a number of amplifier stages equal to the number of seed laser beams, each of the amplifier stages being configured to amplify a different corresponding one of the pump laser beams in the first beam 550.

While the OPO 580 can be tuned (for example, mechanically, by varying the propagation angle of a birefringent crystal to produce two different indices of refraction for incoming light, by varying the temperature of the crystal, or in some materials, by electrical excitation with high voltages, to name a few) to generate different signal and idler wavelengths, in the embodiment of FIG. 5, the tuning of the OPO remains fixed. Instead, the multi-spectral output of the second beam 590 is achieved by varying the wavelengths of the laser oscillators 510, 515, 520, and 525 (together with any corresponding changes in the combiner 540 and amplifier 560).

According to various embodiments, there is a gap between the pump wavelength, and the signal and idler wavelengths generated from an OPO. In different embodiments, the signal and idler waves can be adjusted to lie anywhere from overlapping (degeneracy, such as with frequency halving) to being largely spectrally separated. Accordingly, a near continuum can be created with enough pumps and signal/idler combinations, but there can be a gap between the shorter pumps and the longer OPO wavelengths. Depending on the input (pump) wavelengths, the OPO 580 outputs a second beam 590 that is multiwavelength with coverage across the spectrum range from the shortest pump wavelength to the longest idler wavelength, with the other (pump, signal, and idler) wavelengths distributed in between. For example, in some embodiments, near continuum coverage across the spectrum range from the shortest pump wavelength to the longest idler wavelength is possible by choosing pump wavelengths and signal/idler wavelength generation such that the pump, signal, and idler wavelengths are somewhat evenly distributed and without large coverage gaps between any consecutive pair of wavelengths.

As will be appreciated in light of the present disclosure, different seed lasers (e.g., having distinct wavelengths, such as nearby wavelengths) can be tuned by the OPO to produce a set of output (e.g., signal, idler, and residual pump) wavelengths that provides good coverage of a particular wavelength interval. Increasing the number of distinct seed lasers allows for either a broader range of output or a more continuous set of output wavelengths (e.g., better continuum) within the same wavelength interval.

In the multiwavelength laser source 600 of FIG. 6, the input (pump) lasers, including first laser oscillator 610, second laser oscillator 615, and third laser oscillator 620, provide free space laser output (as opposed to fiber channel output in FIGS. 2 and 5, or other waveguide output in still other embodiments) in the form of input beams 630. The input beams 630 are combined at free-space laser combiner 640 (e.g., a three-into-one combiner configured to combine the three wavelengths of the input beams 630, such as dielectric thin film coated dichroic optics or filters, physical surface gratings, volume Bragg gratings, dispersive prisms, or the like), and output as first beam 650 (e.g., in free space such as a laser rod or along a waveguide such as a fiber optic channel).

The first beam 650 is amplified by an optical amplifier 660, in this case a three-stage amplifier including first amplifier stage 662, second amplifier stage 664, and third amplifier stage 666, each of the amplifier stages being configured to amplify a different one of the three input wavelengths. The optical amplifier 660 outputs an amplified first beam 670, which is input into an optical parametric generator 680 (OPG, similar to an OPO but lacking a resonating cavity). The OPG 680 converts the three input wavelengths into six additional (signal and idler) wavelengths and outputs the nine wavelengths as second beam 690.

Other nonlinear converters can be used in place of OPOs and OPGs. For example, a sum frequency generator (SFG) can be used, which generates the pump wavelength as output from the signal and idler wavelengths, now serving as input seeds. An SFG operates with appropriate wavelengths. This is because, in general, different nonlinear materials and devices have different constraints regarding pump, signal, and idler wavelengths that allow energy transfer and mixing of the different wavelengths according to conservation of energy. The acceptance angle and spectral acceptance bandwidth of the seed sources to be mixed in the nonlinear material depend on a variety of factors such as the nonlinear material and the interaction length. Given two such appropriate input wavelengths, a two-input multiwavelength laser source (e.g., similar to multiwavelength laser source 100 in FIG. 1) with an SFG in place of an OPO or OPG can generate a third wavelength (with frequency equal to the sum of the two input frequencies) and output all three wavelengths as a multi-spectral (three-wavelength) output beam. This process can be extended to more input seeds or wavelengths of light (as in the general OPO cases discussed above), generating corresponding more output wavelengths.

In a similar fashion, a difference frequency generator (DFG) can be used in place of an SFG. The DFG has the pump and one of the signal or idler wavelengths as input, and outputs a third wavelength equal to the other of the signal or idler wavelength (that is, a third wavelength with frequency equal to the difference of the pump frequency and the other input frequency). As such, like the SFG, the DFG can also output laser light having the pump, signal, and idler wavelengths given only two of these wavelengths as input, and can be extended to multiple sets of such pump, signal, and idler wavelengths in an analogous manner as the SFG.

In another example, an optical parametric amplifier (OPA) can also be used in place of other nonlinear converters. An OPA uses a shorter wavelength (pump) beam to amplify a longer wavelength (signal) beam, generating another longer wavelength (idler) beam in the process (similar to the DFG), while outputting residual amounts of the pump beam. See, for example, FIG. 7 for an example multiwavelength light source 700 using an OPA 780 as the nonlinear converter.

In the multiwavelength laser source 700 of FIG. 7, the input (pump) lasers, including first seed last 710 and second seed laser 720, provide fiber channel laser beams as the input beams 730. The input beams 730 are combined at fiber optic laser combiner 740 (e.g., a two-into-one fiber laser combiner 740 configured to combine the two wavelengths of the input beams 730), and output as first beam 750 along a fiber optic channel. The first beam 750 is amplified by an optical amplifier 760 configured to amplify both input wavelengths. The optical amplifier 760 outputs an amplified first beam 770, which is input into an optical combiner 775. Concurrently, a white light generator (WLG) 755 is a laser generator that generates a signal seed beam 765 having longer wavelength broad spectrum light (such as over a range of 100 nm or more), though not necessarily visible wavelengths. For example, the signal seed beam 765 may include two or more IR wavelengths. The signal seed beam 765 is also input into the optical combiner 775.

The optical combiner 775 spatially combines the wavelengths of the amplified first beam 770 and the signal seed beam 765 into a combined first beam 777. For example, the optical combiner 775 can be a free space optic or set of optics such as dichroic thin film filters, or other components such as prisms, surface gratings, or volume Bragg gratings, to name a few. In addition, depending on factors such as the wavelengths involved, there could be circumstances that allow for a fiber-based combiner, such as a fiber-coupled laser combiner (e.g., using dichroic optics, a fused fiber optic coupler, a fiber Bragg grating, or the like).

The combined first beam 777 is input to an optical parametric amplifier 780 (OPA, similar to an OPO but lacking a resonating cavity) as a pump input laser beam. The OPA 780 amplifies one or more of the signal seed beam wavelengths (depending on the pump wavelengths making up the amplified first beam 770). Residual amounts of the pump beam (e.g., from amplified first beam 770) and unamplified wavelengths of the signal seed beam (e.g., from signal seed beam 765) can pass through the OPA 780 to join the amplified wavelengths of the signal seed beam 765 as well as the newly created wavelengths representing the idler beam(s) and be output as the second beam 790. This allows the nonlinear converter (in this case, OPA 780) in the multiwavelength laser source 700 to amplify additional laser beam input (e.g., from signal seed beam 765) while generating new (idler) wavelengths for the second beam 790 as well as passing the existing wavelengths of the amplified first beam 770.

The multiwavelength laser source 700 uses an unamplified signal seed beam 765. However, other embodiments are not limited as such. For example, in some embodiments, the WLG 755 outputs the signal seed beam 765 to the laser combiner 740 for combining with the seed beams 730 and subsequent amplifying through the common optical amplifier 760. In some other embodiments, the signal seed beam 765 is amplified separately from the first beam 750 (e.g., using another optical amplifier) prior to combining with the amplified first beam 770 in the optical combiner 775.

In other embodiments of the multiwavelength laser source, a WLG or other IR seed sources serve as a (longer wavelength) seed source to an OPA driven by the multiple pump laser wavelengths (e.g., as combined and amplified in the multiwavelength laser source). For instance, an injected (IR) WLG seed beam (or other IR seed source) can be an input to the OPA, the separate WLG pulsed emissions being synchronized with the with the amplified first beam (e.g., amplified first beam 770, the pump laser wavelengths). For example, the additional IR seed wavelengths can be collinear and coaxial incident on the OPA. As such, other signal beam wavelengths (in addition to the input seed beams) can be amplified, used to generate additional wavelengths through a nonlinear converter, and output as part of the multiwavelength laser source output beam by using an OPA with an external seed (WLG or other suitable seed source) as the nonlinear converter.

Figure 8:
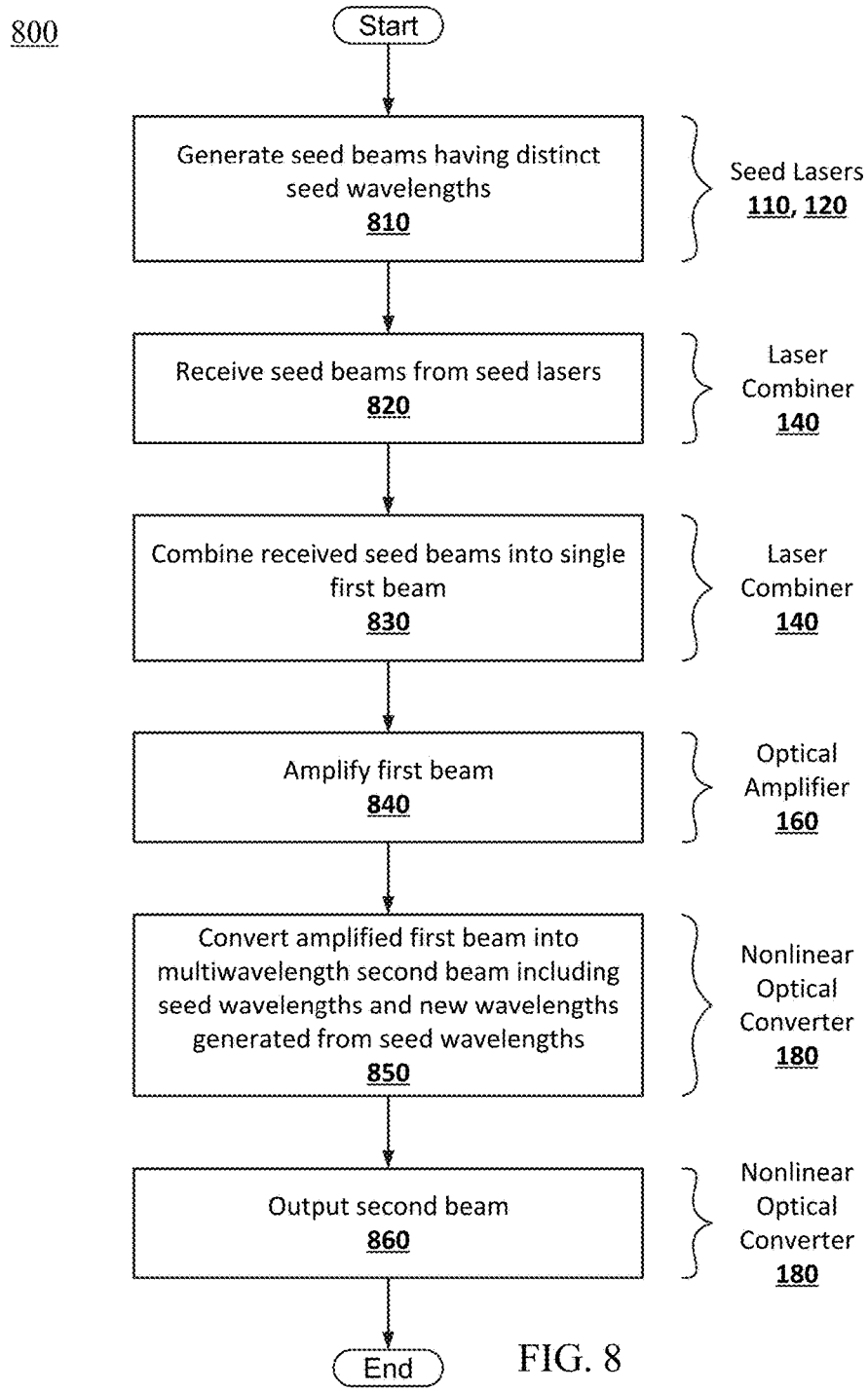
FIG. 8 is a flowchart illustrating a methodology for driving a multiwavelength laser source, according to an embodiment of the present disclosure.

FIG. 8 is a flowchart illustrating an example method 800 for driving a multiwavelength laser source according to an embodiment of the present disclosure. As can be seen, example method 800 includes a number of phases and sub-processes, the sequence of which may vary from one embodiment to another. However, when considered in the aggregate, these phases and sub-processes form a process for driving a multiwavelength laser source according to embodiments of the present disclosure. These embodiments can be implemented, for example using the system architecture illustrated in FIG. 1 as described above. However, other system architectures can be used in other embodiments, such as those in FIGS. 2 and 5-6 or other architecture, as will be apparent in light of this disclosure. To this end, the correlation of the various functions shown in FIG. 8 to the specific components illustrated in FIG. 1 is not intended to imply any structural or use limitations. Rather, other embodiments may include, for example, varying degrees of integration wherein multiple functionalities are effectively performed by one component or multiple components perform one functionality. Thus, other embodiments may have fewer or more components or operations depending on the granularity of implementation. Numerous variations and alternative configurations will be apparent in light of this disclosure.

As illustrated in FIG. 8, in one embodiment, method 800 for driving a multiwavelength laser source commences, and at operation 810, a plurality of seed beams is generated from a corresponding plurality of seed lasers and having a corresponding plurality of distinct seed wavelengths. See, for example, first and second seed lasers 110 and 120 of FIG. 1. In another embodiment, the plurality of seed lasers includes at least three such seed lasers. At operation 820, the generated seed beams are received at a laser combiner. See, for example, laser combiner 140 of FIG. 1. In an embodiment, the seed beams are transmitted by optical fibers. At operation 830, the received seed beams are combined into a single first beam (having the seed wavelengths) at the laser combiner. See, for example, the laser combiner 140 of FIG. 1.

At operation 840, the first beam is amplified with an optical amplifier. See, for example, optical amplifier 160 of FIG. 1. In an embodiment, the amplifying of the first beam further includes amplifying all the seed wavelengths in the first beam. At operation 850, a single nonlinear optical converter (such as an OPO, OPG, SFG, DFG, or the like) is used to convert the amplified first beam into a second beam that includes the seed wavelengths and one or more new wavelengths distinct from and generated from the seed wavelengths. See, for example, nonlinear optical converter 180 of FIG. 1. At operation 860, the nonlinear optical converter outputs the second beam. In other embodiments, additional operations may be performed, as previously described in connection with the multiwavelength laser sources of FIGS. 1-2 and 5-6.

Numerous specific details have been set forth herein to provide a better understanding of the embodiments. It will be understood by an ordinarily-skilled artisan, however, that the embodiments may be practiced without these specific details. In other instances, well known operations, components, and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features or methodological acts, it is to be understood that the subject matter defined in the appended claims is not necessarily limited to the specific features or acts described herein. Rather, the specific features and acts described herein are disclosed as example forms of implementing the claims.

Additional Embodiments

Figure 9:
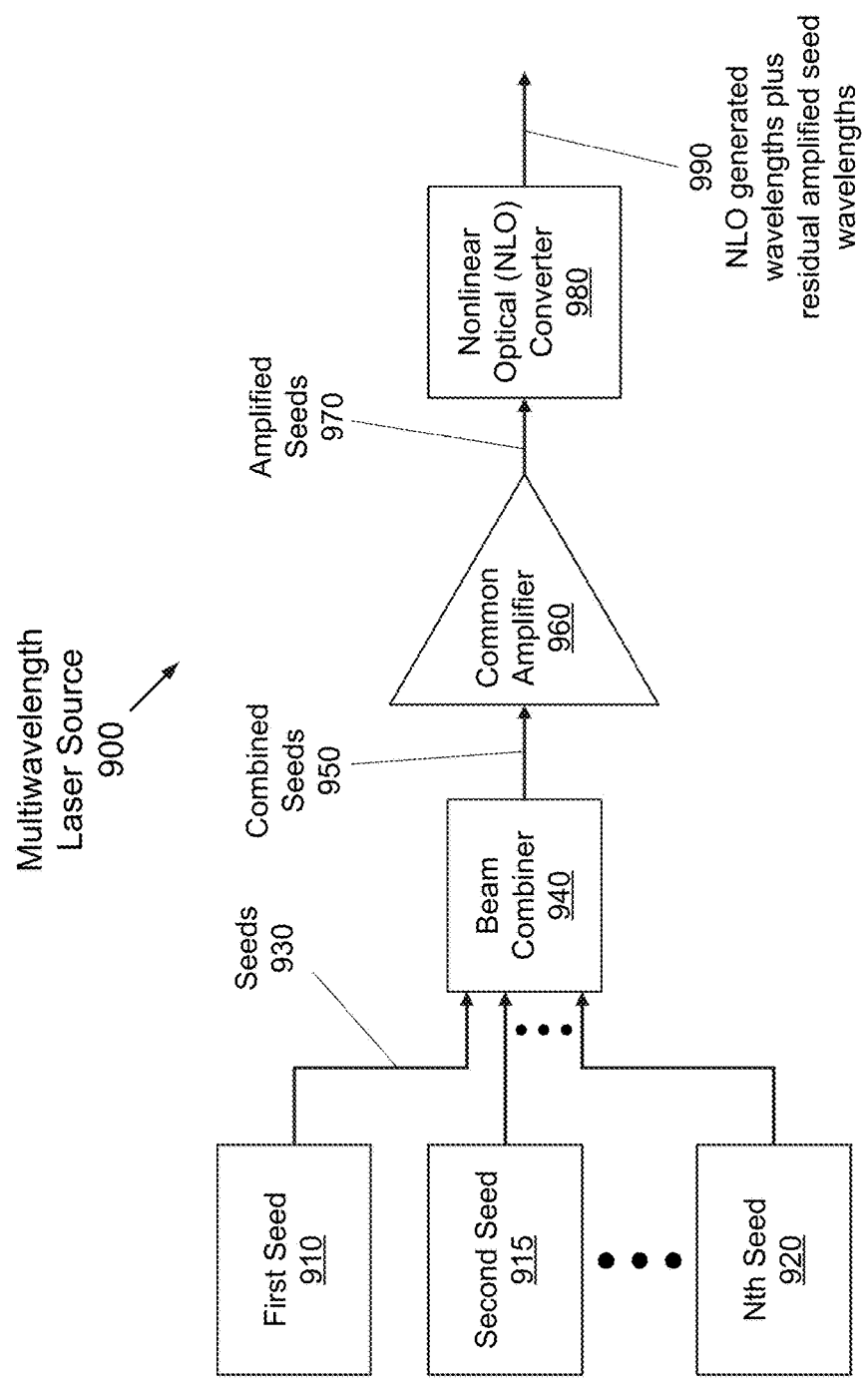
FIGS. 9-11 illustrate example multiwavelength laser sources, according to other embodiments of the present disclosure.
Figure 10:
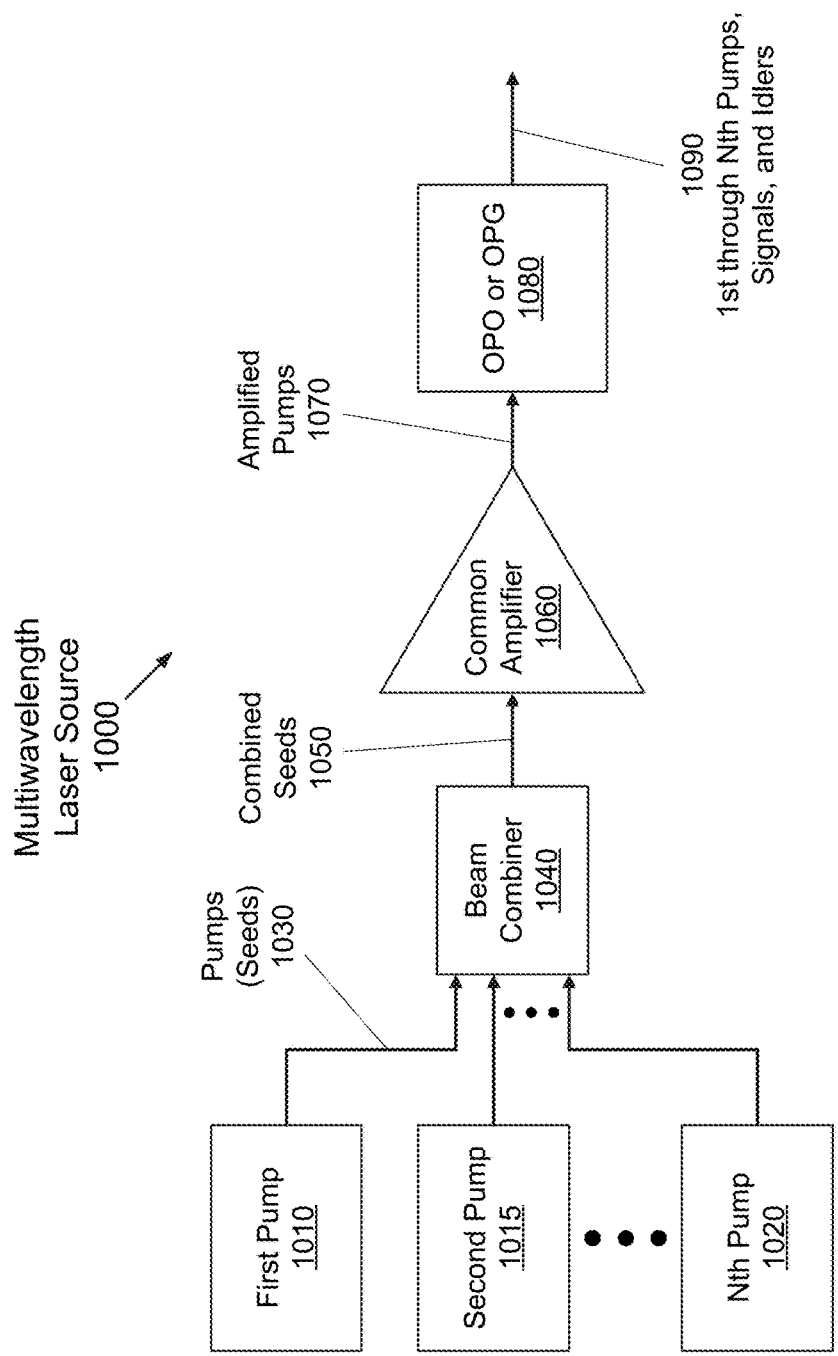
Figure 11:
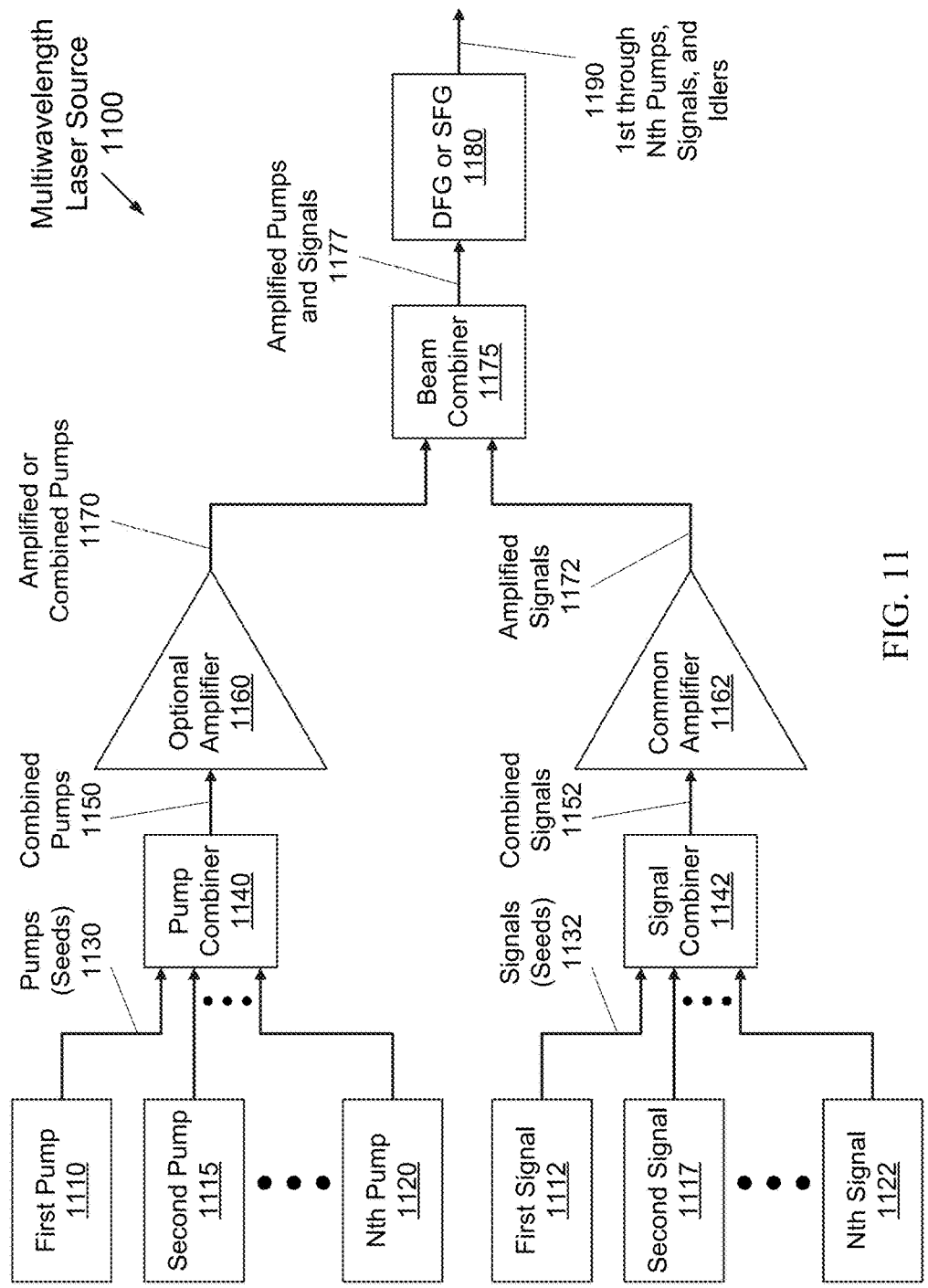

FIGS. 9-11 illustrate example multiwavelength laser sources 900-1100, according to other embodiments of the present disclosure. The multiwavelength laser source 900 of FIG. 9 illustrates a general structure, specific examples of which are described below. The multiwavelength laser sources 1000-1100 of FIGS. 10-11 illustrate more constrained structures.

In the multiwavelength laser source 900 of FIG. 9, interactions (such as at nonlinear optical (NLO) converter 980) can be, for example, second order parametric (as described further below) or third order (such as four-wave mixing, Raman, self-phase modulation, to name a few) due to, for instance, nonlinear changes in the refractive index of the medium. In some embodiments, the second order interactions are perfectly phase matched. In some other embodiments, the second order interactions are non-perfectly phase matched. In multiwavelength laser source 900, there are N seed lasers (N≥2) or seeds 930, namely first seed 910, second seed 915, . . . , Nth seed 920. Each of the N seeds 930 can be, for example, any combination of one or two waves out of three waves involved in a nonlinear interaction (e.g., any one or two of the pump, signal, or idler waves). Further, any number of these input seeds 930 can be used to create multiple output wavelengths to form a near continuum of output (and residual input) wavelengths. For example, in one embodiment, there could be N pump waves combined with N signal waves to generate N DFG (e.g., idler) waves, with all N pump, N signal, and N idler waves being output.

The seeds 930 can be, for example, pulsed or continuous wave in time. In addition, the seeds 930 can be mixed temporally, for example, in sequence or simultaneous. The seeds 930 are combined in a beam combiner 940 that combines the N seeds 930 into a single combined beam 950. The beam combiner 940 can be, for example, a fiber-based combiner or a free space combiner, and can include one or more components. Example components for a free space combiner include thin film filters or dichroics, gratings, volume Bragg gratings (VBGs), prisms, and the like. If the beam combiner 940 is fiber-based, it can include fiber-based components such as fiber Bragg gratings, wavelength-division multiplexing (WDM) couplers, and the like. If the beam combiner 940 is free space, the components should propagate all seeds 930 nearly collinear through the subsequent stages, such as amplifiers and the NLO converter.

The combined seeds (or beam) 950 are input into a common amplifier 960, which can include one or more stages or amplifiers. The amplifier 960 should be transparent to the seeds 930 and have broad enough gain bandwidth to amplify all colors. The amplifier 960 can be, for example, fiber (guided) or crystal (free space) based and can be single or multiple stages. The amplifier 960 can be, for example, single pass, multiple pass, or regenerative (such as switched into an oscillator for a number of round trips).

The amplified seeds 970 output from the amplifier 960 are input to the NLO converter 980. In some embodiments, the NLO converter 980 achieves phase matching with all the wavelengths by some second order parametric process (e.g., OPO, OPG, SFG, DFG, OPA, and the like). In some embodiments, third order processes also occur. In one or more embodiments, the NLO converter 980 is low loss (such as exhibiting absorption at all wavelengths). The nonlinear process can occur, for example, in crystalline solids, but in some embodiments, the process occurs in gases or plasmas. The NLO converter 980 outputs the various generated and residual wavelengths 990 as an output beam. The output beam 990 can include, for example, wavelengths spanning a near continuum of coverage across a particular frequency window (e.g., part of the IR or visible spectrum).

In the multiwavelength laser source 1000 of FIG. 10, there are N (N≥2) seeds or pumps 1030, including first pump 1010, second pump 1015, . . . , Nth pump 1020 that are combined at beam combiner 1040 into combined seeds 1050, which are amplified by a common amplifier 1060 to generate amplified pumps 1070. The amplified pumps 1070 are used to pump an OPO or OPG 1080, which generates N new signal and idler wave pairs output with the residual pumps as output beam 1090.

In the multiwavelength laser source 1100 of FIG. 11, there are N (N≥2) pump seeds or pumps 1130, including first pump 1110, second pump 1115, . . . , Nth pump 1120 that are combined at pump (beam) combiner 1140 into combined pumps 1150, which are (optionally) amplified by an (optional) common amplifier 1160 to generate amplified or combined pumps 1170. In addition, there are N signal seeds or signals 1132, including first signal 1112, second signal 1117, . . . , Nth signal 1122 that are combined at signal (beam) combiner 1142 into combined signals 1152, which are amplified by a common amplifier 1162 to generate amplified signals 1172. In some embodiments, the pumps 1130 are the highest power (or energy) and do not necessarily need an amplifier, hence the optional amplifier 1160. The amplified (or combined) pumps 1170 and amplified signals 1172 are combined at beam combiner 1175 to produce amplified pumps and signals 1177, which are then input to a final OPA (e.g., DFG) or SFG stage 1180 that generates N additional wavelengths (e.g., N additional idler wavelengths) depending on factors such as the type of NLO operation performed by the DFG or SFG 1180 and the strengths and wavelengths of the pumps 1130 and signals 1132 used to seed the multiwavelength laser source 1100. The final output beam 1190 from the DFG or SFG 1180 includes wavelengths from the N pumps, N signals, and N idler beams.

Figure 12:
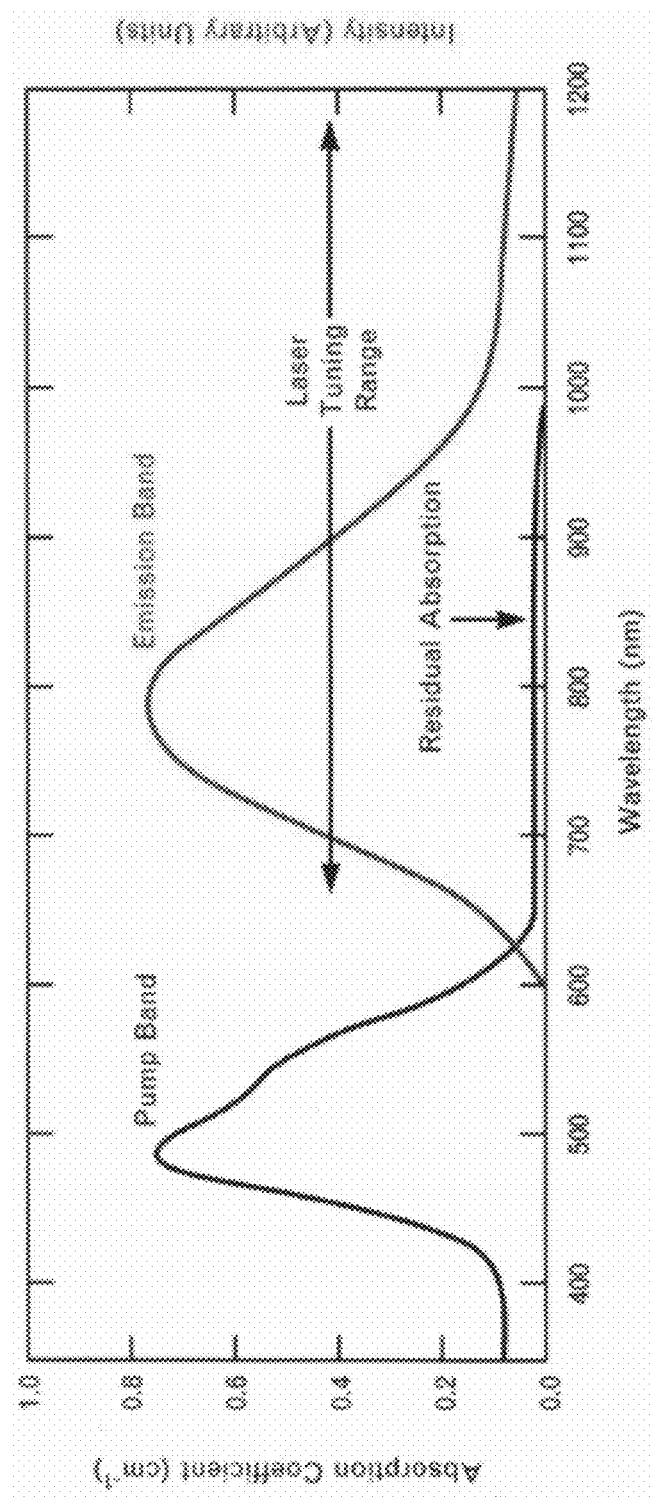

According to one or more embodiments of the present disclosure, a pump and a signal (or any two beams selected from pump, signal, and idler) are amplified in a common amplifier. The seeds for these beams can be, for example, two continuous wave (CW) external cavity diode lasers operating at wavelengths between 700 nm and 1100 nm. These seeds can be combined (e.g., in a laser combiner) and injected via free space into a titanium sapphire (Ti:Al$_2$O$_3$) regenerative amplifier. This common amplifier has a gain band width from 600 nm to 1100 nm and can amplify slices of both beams that are trapped in the resonator generating two high peak power pulses. FIG. 12 illustrates emission and absorption bands of titanium sapphire (Ti:Al$_2$O$_3$), and is reproduced from Wall et al., Titanium Sapphire Lasers, The Lincoln Laboratory Journal, vol. 3, no. 3, pp. 447-462, 1990.

For ease of description, the two wavelengths can be considered a pump and a signal. The two amplified wavelengths can then be sent to an NLO crystal that can be selected from its properties for either difference frequency generation (DFG) to the mid-IR or for sum frequency generation (SFG) to the visible. In some embodiments, specific pairs of pumps and signals (or of signals and idlers, or the like) that have the same crystal angle are used. In some other embodiments, a fixed pump and a varying signal are used (e.g., to the extent of crystal spectral acceptance bandwidth). In still some other embodiments, if the pump is spectrally broad (e.g., with femtosecond laser sources), then for any signal there would be a portion of the pump that would phase match correctly with it for either DFG or SFG applications. More specifically, in one embodiment, lithium niobate (e.g., LiNbO$_3$) is used for DFG with wavelengths between 700 nm and 1000 nm at fixed 48.4° phase-matching angle (see FIG. 13 and discussion below). In another embodiment, β-barium borate (BBO) is used for SFG with wavelengths between 700 nm and 1000 nm at fixed 26.95° phase-matching angle (see FIG. 14 and discussion below). In one or more embodiments, the wavelengths (e.g., pump and signal wavelengths) involved are close enough that they can be amplified by a common amplifier material.

Figure 13:
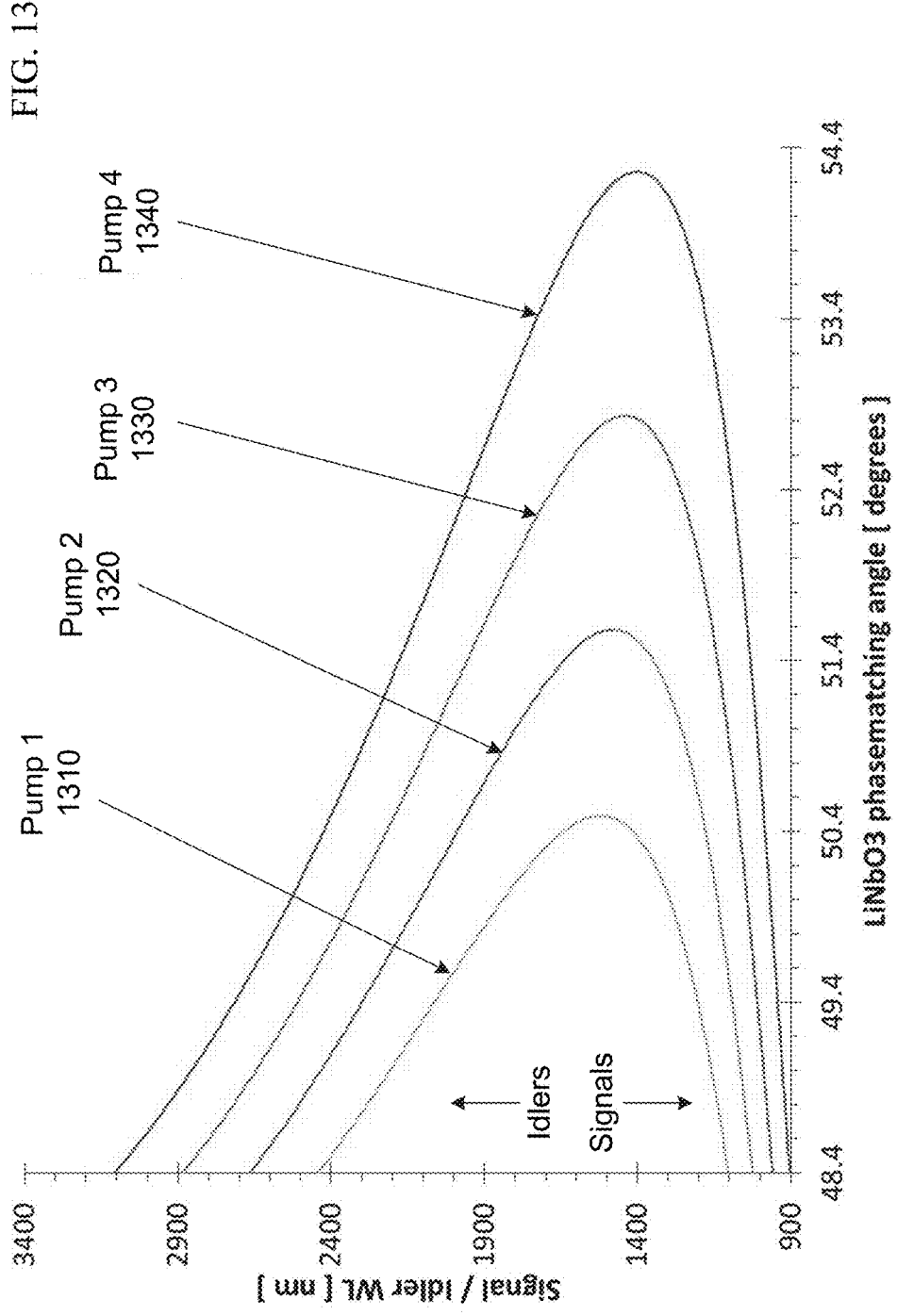
FIG. 13 illustrates example phase-matching curves versus difference-frequency generator (DFG) crystal angle for four distinct pump wavelengths for a lithium niobate nonlinear crystal DFG, according to an embodiment of the present disclosure.

FIG. 13 illustrates example phase-matching curves versus difference-frequency generator (DFG) crystal angle for four distinct pump wavelengths for a lithium niobate nonlinear crystal DFG, according to an embodiment of the present disclosure. The phase-matching curves of FIG. 13 are similar to those of FIGS. 3-4, except they are based on a lithium niobate (e.g., LiNbO$_3$) crystal instead of a zinc germanium phosphide (ZGP) crystal, and they are for a DFG-based nonlinear optical system versus an OPO-based nonlinear optical system. In this example, amplified pump and signal beams (with wavelengths between 700 nm and 1100 nm) are mixed in the lithium niobate crystal to generate corresponding longer idler wavelengths (between 2450 nm and 3100 nm) in the mid-IR region.

In further detail, in FIG. 13, the phase-matching curves for four separate pump beams, namely Pump 1 (curve 1310, representing 760 nm), Pump 2 (curve 1320, representing 740 nm), Pump 3 (curve 1330, representing 720 nm), and Pump 4 (curve 1340, representing 700 nm), are illustrated. These pump wavelengths are mixed with their corresponding signal wavelengths in the lithium niobate crystal DFG. Here, the DFG is tuned at a fixed phase-matching angle of 48.4° (coinciding with the y-axis of FIG. 13) to produce corresponding signal wavelengths of 1101 nm for Pump 1, 1024 nm for Pump 2, 957 nm for Pump 3, and 903 nm for Pump 4. Accordingly, corresponding idler wavelengths of 2454 nm for Pump 1, 2667 nm for Pump 2, 2907 nm for Pump 3, and 3115 nm for Pump 4, are generated by the DFG and output with residual amounts of the pump and signal wavelengths.

Figure 14:
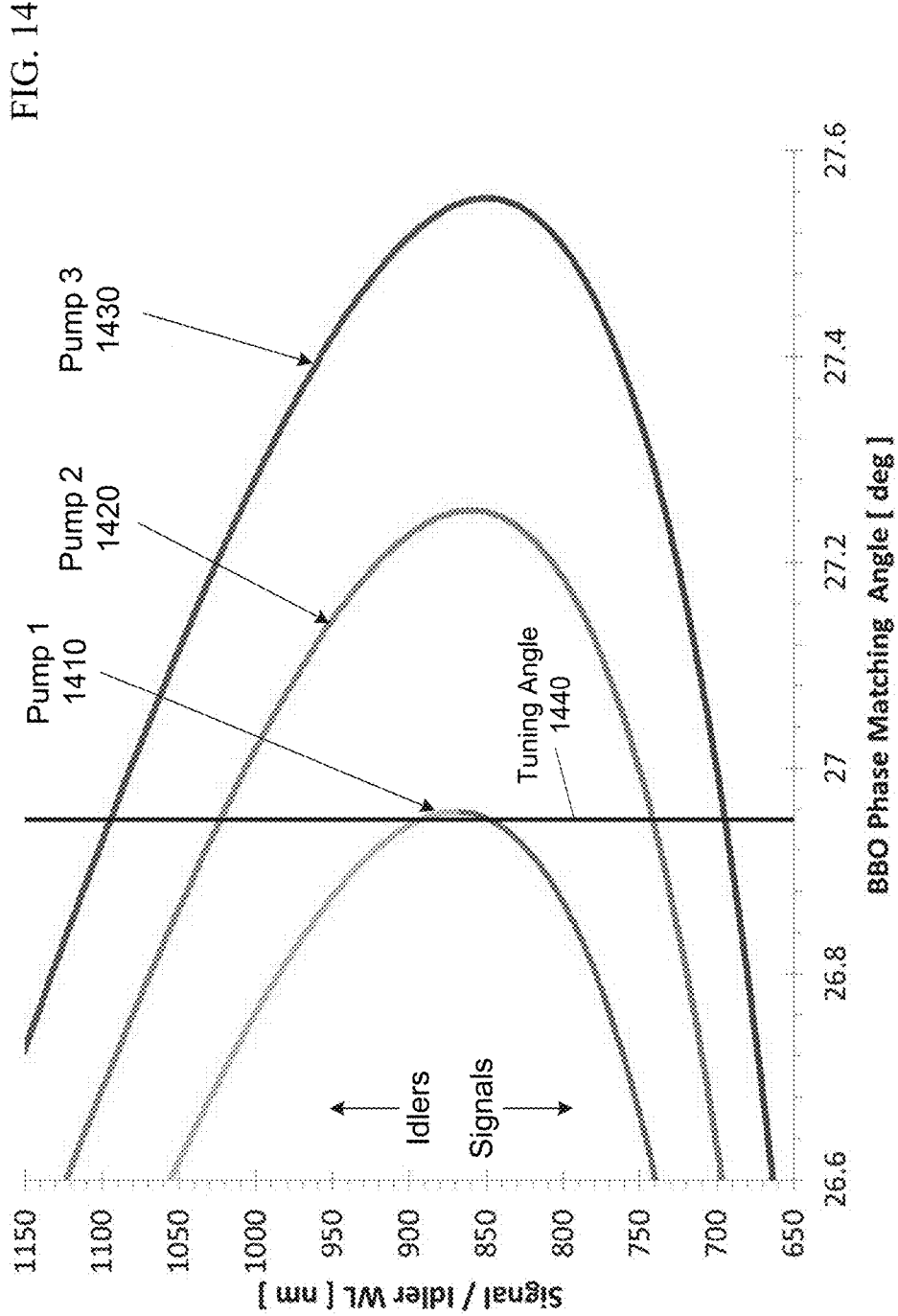
FIG. 14 illustrates example phase-matching curves versus sum-frequency generator (SFG) crystal angle for three distinct pump wavelengths for a β-barium borate (BBO) nonlinear crystal SFG, according to an embodiment of the present disclosure.

FIG. 14 illustrates example phase-matching curves versus sum-frequency generator (SFG) crystal angle for three distinct pump wavelengths for a β-barium borate (BBO) nonlinear crystal SFG, according to an embodiment of the present disclosure. The phase-matching curves of FIG. 14 are similar to those of FIGS. 3-4 and 13, except they are based on β-barium borate (BBO) crystal and they are for an SFG-based nonlinear optical system. In this example, amplified signal and idler beams (with wavelengths between 700 nm and 1100 nm) are mixed in the BBO crystal to generate shorter (and, in this case, visible) pump wavelengths (between 425 nm and 435 nm).

In further detail, in FIG. 14, the phase-matching curves for three separate pump beams, namely Pump 1 (curve 1410, representing 435 nm), Pump 2 (curve 1420, representing 430 nm), and Pump 3 (curve 1430, representing 425 nm) are illustrated. The tuning angle of the BBO crystal is set to 26.95°. Three different corresponding sets of signal and idler beams are determined for the pump beams, namely 847 nm signal and 894 nm idler for Pump 1, 741 nm signal and 1024 nm idler for Pump 2, and 694 nm signal and 1097 nm idler for Pump 3, and these signal and idler wavelengths are mixed in the BBO crystal SFG. Here, the SFG is tuned at a fixed phase-matching angle of 26.95° (coinciding with the tuning angle line 1440 of FIG. 14) to produce corresponding pump wavelengths of 435 nm for Pump 1, 430 nm for Pump 2, and 425 nm for Pump 3, which are generated by the SFG and output with residual amounts of the signal and idler wavelengths.

Figure 15:
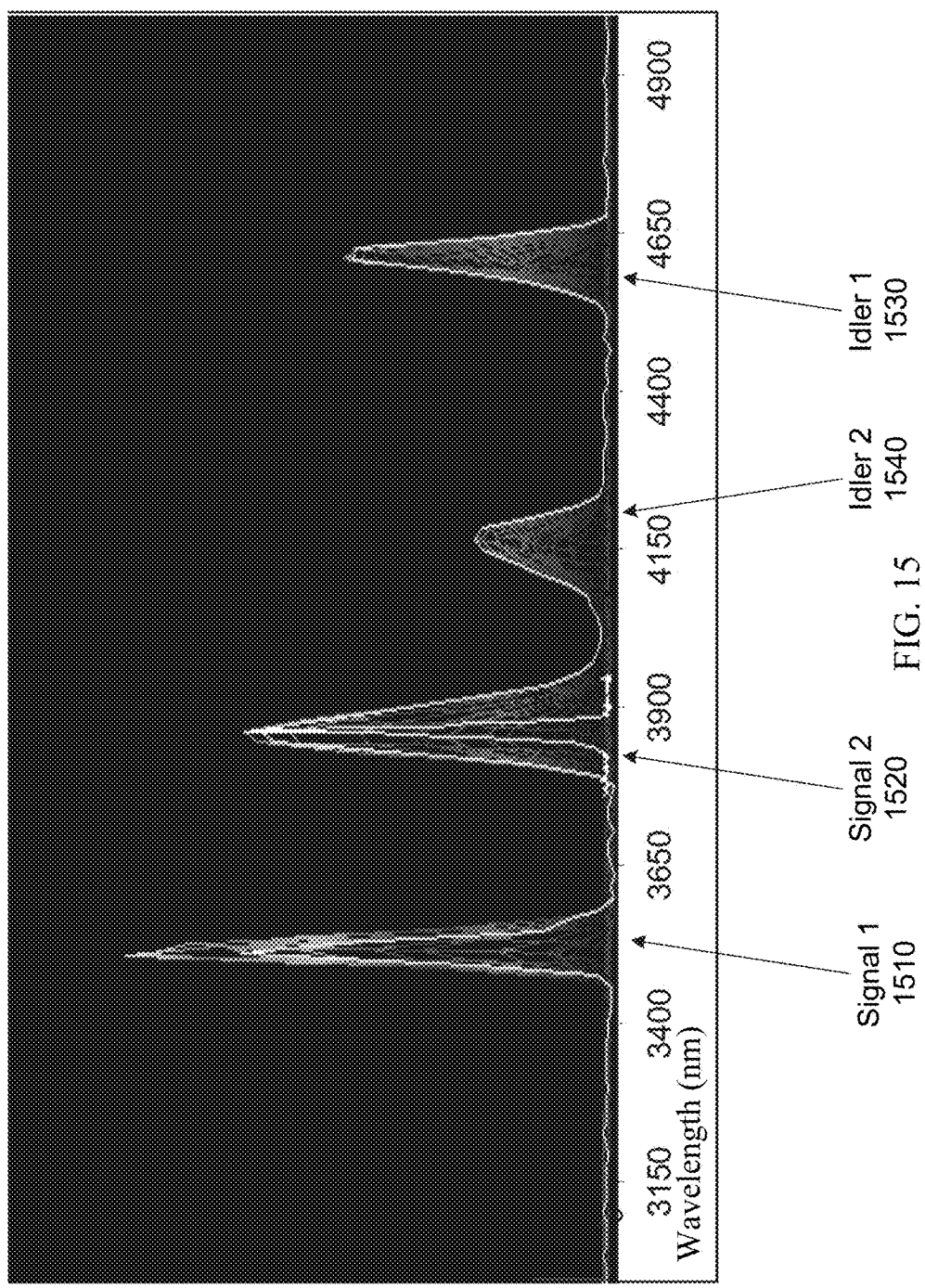
FIG. 15 illustrates four generated signal and idler wavelength distributions output from an example multiwavelength laser source input with two corresponding pump beams, according to an OPO embodiment of the present disclosure

FIG. 15 illustrates four generated signal and idler wavelength distributions output from an example multiwavelength laser source input with two corresponding pump beams, according to an OPO embodiment of the present disclosure. In the OPO embodiment of FIG. 15, two pump laser "seeds," Pump 1 having a wavelength of 1993 nm, Pump 2 having a wavelength of 2004 nm, are spectrally combined and amplified in a common thulium-doped fiber amplifier chain. The seeds are delivered in nanosecond pulses offset in time from each other and temporally interleaved, and then amplified in a common amplifier and used to pump a fixed-angle ZGP OPO. Pump 1 generates signal and idler beams, Signal 1 (region 1510) and Idler 1 (region 1530), having respective wavelength distributions centered around 3511 nm and 4633 nm. Pump 2 generates signal and idler beams, Signal 2 (region 1520) and Idler 2 (region 1540), having respective wavelength distributions centered around 3857 nm and 4167 nm. The generated signal and idler beams are roughly evenly distributed in the IR band from 3400 nm to 4700 nm.

Figure 16:
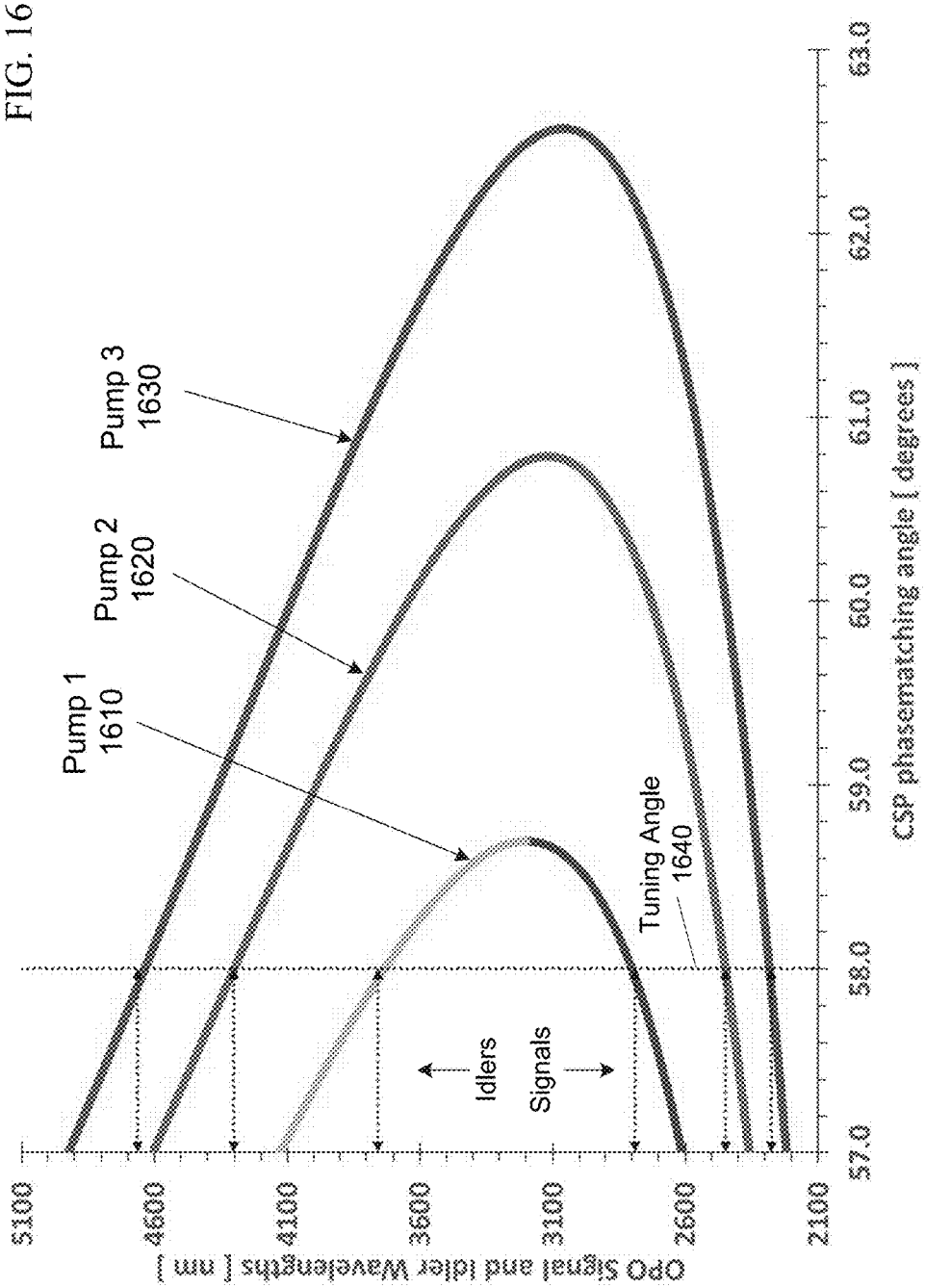
FIG. 16 illustrates example phase-matching curves versus OPO crystal angle for three distinct pump wavelengths for a cadmium silicon phosphide (CSP) nonlinear crystal OPO, according to an embodiment of the present disclosure.

FIG. 16 illustrates example phase-matching curves versus OPO crystal angle for three distinct pump wavelengths for a cadmium silicon phosphide (CSP) nonlinear crystal OPO, according to an embodiment of the present disclosure. The phase-matching curves of FIG. 16 are similar to those of FIGS. 3-4 and 13-14, except they are based on cadmium silicon phosphide (CSP) crystal for an OPO-based nonlinear optical system. In this example, three seeds at around 1.5 microns are combined and amplified in EDFAs, and the amplified beams are sent to a CSP OPO at a fixed angle of 58°. This generates new signal/idler pairs covering a range of 2.3-4.6 microns with good coverage (e.g., good separation between pairs of output beams).

In further detail, in FIG. 16, the phase-matching curves for three separate pump beams, namely Pump 1 (curve 1610, representing 1600 nm), Pump 2 (curve 1620, representing 1560 nm), and Pump 3 (curve 1630, representing 1530 nm) are illustrated. Three different corresponding sets of signal and idler beams are generated from the pump beams, namely 2787 nm signal and 3756 nm idler for Pump 1, 2448 nm signal and 4302 nm idler for Pump 2, and 2277 nm signal and 4662 nm idler for Pump 3, in the CSP crystal OPO. Here, the OPO is tuned at a fixed phase-matching angle of 58° (coinciding with the tuning angle line 1640 of FIG. 16). The tuned OPO generates and outputs the signal and idler beams together with residual portions of the pump beams.

Figure 17:
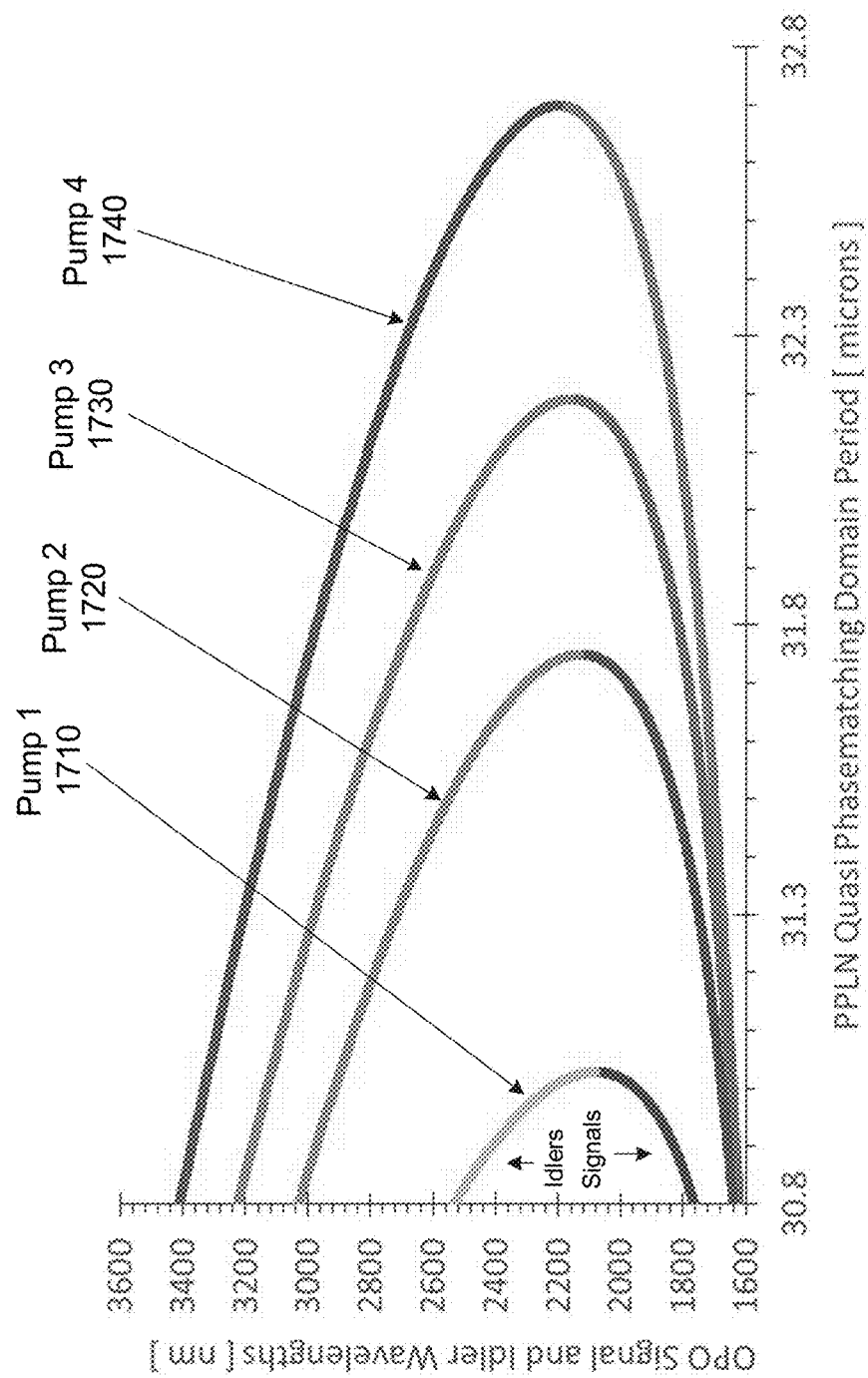
FIG. 17 illustrates example phase-matching curves versus periodically-poled lithium niobate (PPLN) quasi phase-matching domain period for four distinct pump wavelengths for a PPLN nonlinear crystal OPO, according to an embodiment of the present disclosure.

FIG. 17 illustrates example phase-matching curves versus periodically-poled lithium niobate (PPLN) quasi phase-matching domain period for four distinct pump wavelengths for a PPLN nonlinear crystal OPO, according to an embodiment of the present disclosure. PPLN uses a domain period (usually measured in microns) for coarse tuning, with a PPLN crystal including numerous regions, each having a slightly different domain period. Fine tuning can be achieved by adjusting the temperature of the PPLN crystal. In other respects, the phase-matching curves of FIG. 17 are similar to those of FIGS. 3-4, 13-14, and 16. In this example, three seeds at around 1 micron are combined and amplified in YDFAs, and the amplified beams are sent to a PPLN OPO operating at 300° K and a fixed grating domain period of 30.8 This generates new signal/idler pairs covering a range of 1.6-3.4 microns with good coverage (e.g., good separation between pairs of output beams).

In further detail, in FIG. 17, the phase-matching curves for four separate pump beams, namely Pump 1 (curve 1710, representing 1040 nm), Pump 2 (curve 1720, representing 1064 nm), Pump 3 (curve 1730, representing 1080 nm), and Pump 4 (curve 1740, representing 1100 nm) are illustrated. Four different corresponding sets of signal and idler beams are generated from the pump beams, namely 1763 nm signal and 2537 nm idler for Pump 1, 1639 nm signal and 3032 nm idler for Pump 2, 1623 nm signal and 3228 nm idler for Pump 3, and 1622 nm signal and 3416 nm idler for Pump 4, in the PPLN crystal OPO. Here, the OPO is tuned at a fixed temperature of 300° K and a fixed domain period of 30.8 µm (coinciding with the y-axis of FIG. 17), which generates and outputs the signal and idler beams together with residual portions of the pump beams.

Figure 18:
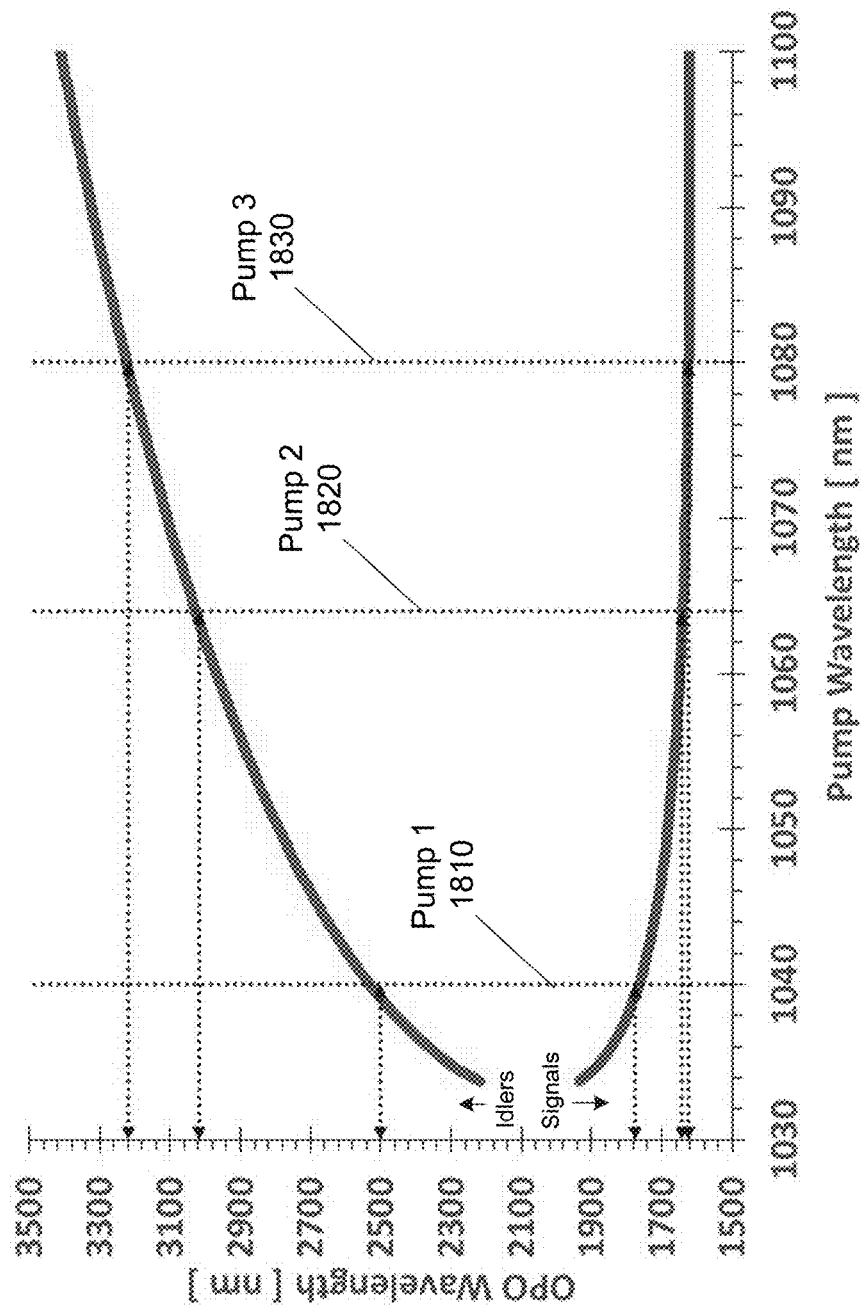
FIG. 18 illustrates example signal and idler wavelength matching curves for varying pump wavelengths in a particular PPLN OPO arrangement with fixed temperature and grating period, according to an embodiment of the present disclosure.

FIG. 18 illustrates example signal and idler wavelength matching curves for varying pump wavelengths in a particular PPLN OPO arrangement with fixed temperature and grating period, according to an embodiment of the present disclosure. In this example, three seeds at around 1 micron are combined and amplified in YDFAs, and the amplified beams are sent to a PPLN OPO operating at 300° K and a fixed grating period of 30.8 µm. This generates new signal/idler pairs covering a range of 1.6-3.2 microns.

In further detail, in FIG. 18, the tuning characteristics of the PPLN OPO are kept fixed at 300° K and 30.8 µm grating period, while the x-axis represents the pump wavelength and the y-axis represents the corresponding signal (bottom curve) and idler (top curve) wavelengths for the PPLN OPO operating under these tuning characteristics. Three separate pump beams are identified, namely Pump 1 (line 1810, representing 1040 nm), Pump 2 (line 1820, representing 1064 nm), and Pump 3 (line 1830, representing 1080 nm). Three different corresponding sets of signal and idler beams are generated from the pump beams, namely 1777 nm signal and 2502 nm idler for Pump 1, 1642 nm signal and 3017 nm idler for Pump 2, and 1624 nm signal and 3220 nm idler for Pump 3, in the PPLN crystal OPO. The generated signal and idler beams together with residual portions of the pump beams are output from the OPO.

Further Example Embodiments

The following examples pertain to further embodiments, from which numerous permutations and configurations will be apparent.

Example 1 is a multiwavelength laser source including: a plurality of seed lasers to generate a corresponding plurality of seed beams having a corresponding plurality of distinct seed wavelengths; a laser combiner to receive and combine the seed beams into a single first beam; an optical amplifier to amplify the first beam; and a fixed nonlinear converter to convert and output the amplified first beam as a multiwavelength second beam including the seed wavelengths and one or more new wavelengths distinct from and generated from the seed wavelengths.

Example 2 includes the subject matter of Example 1, where the nonlinear converter is an optical parametric oscillator (OPO) or an optical parametric generator (OPG), and the one or more new wavelengths include a corresponding plurality of signal wavelengths and a corresponding plurality of idler wavelengths.

Example 3 includes the subject matter of Example 2, where the plurality of signal wavelengths and the plurality of idler wavelengths are distinct from each other and from the seed wavelengths.

Example 4 includes the subject matter of Example 1, where the nonlinear converter is a sum frequency generator (SFG) or a difference frequency generator (DFG), the seed wavelengths include two of a pump wavelength, a signal wavelength, and an idler wavelength, and the one or more new wavelengths include a remaining one of the pump wavelength, the signal wavelength, and the idler wavelength.

Example 5 includes the subject matter of Example 1, further including a signal laser to generate a signal beam having one or more distinct signal wavelengths, and an optical combiner to combine the amplified first beam and the signal beam into a combined first beam, where the nonlinear converter is an optical parametric amplifier (OPA), the seed wavelengths include two or more pump wavelengths, the OPA is configured to convert and output the combined first beam as the multiwavelength second beam, and the one or more new wavelengths include idler wavelengths generated by the OPA.

Example 6 includes the subject matter of Example 1, further including a corresponding plurality of fiber channels to transmit the seed beams to the laser combiner.

Example 7 includes the subject matter of Example 1, where the optical amplifier includes a plurality of amplifier stages, each stage being configured to amplify one or more of the seed wavelengths in the first beam.

Example 8 includes the subject matter of Example 1, where the optical amplifier is further configured to amplify all of the seed wavelengths in the first beam.

Example 9 includes the subject matter of Example 8, where the optical amplifier includes a corresponding plurality of amplifier stages, each stage being configured to amplify a respective one of the seed wavelengths in the first beam.

Example 10 includes the subject matter of Example 1, where the plurality of seed lasers includes at least three said seed lasers.

Example 11 is a method of driving a multiwavelength laser source, the method including: generating, from a plurality of seed lasers, a corresponding plurality of seed beams having a corresponding plurality of distinct seed wavelengths; receiving, at a laser combiner, the seed beams from the seed lasers; combining, at the laser combiner, the received seed beams into a single first beam; amplifying, with an optical amplifier, the first beam; converting, with a fixed nonlinear converter, the amplified first beam into a multiwavelength second beam including the seed wavelengths and one or more new wavelengths distinct from and generated from the seed wavelengths; and outputting, by the nonlinear converter, the second beam.

Example 12 includes the subject matter of Example 11, where the nonlinear converter is an optical parametric oscillator (OPO) or an optical parametric generator (OPG), and the one or more new wavelengths include a corresponding plurality of signal wavelengths and a corresponding plurality of idler wavelengths.

Example 13 includes the subject matter of Example 12, where the plurality of signal wavelengths and the plurality of idler wavelengths are distinct from each other and from the seed wavelengths.

Example 14 includes the subject matter of Example 11, where the nonlinear converter is a sum frequency generator (SFG) or a difference frequency generator (DFG), the seed wavelengths include two of a pump wavelength, a signal wavelength, and an idler wavelength, and the one or more new wavelengths include a remaining one of the pump wavelength, the signal wavelength, and the idler wavelength.

Example 15 includes the subject matter of Example 11, further including generating, from a signal laser, a signal beam having one or more distinct signal wavelengths, and combining, with an optical combiner, the amplified first beam and the signal beam into a combined first beam, where the nonlinear converter is an optical parametric amplifier (OPA), the seed wavelengths include two or more pump wavelengths, the converting of the amplified first beam includes converting the combined first beam into the multiwavelength second beam, and the one or more new wavelengths include idler wavelengths generated by the OPA.

Example 16 includes the subject matter of Example 11, further including transmitting, over a corresponding plurality of fiber channels, the seed beams to the laser combiner.

Example 17 includes the subject matter of Example 11, where the optical amplifier includes a plurality of amplifier stages, and the amplifying of the first beam includes amplifying, at each amplifier stage, one or more of the seed wavelengths in the first beam.

Example 18 includes the subject matter of Example 11, where the amplifying of the first beam includes amplifying all of the seed wavelengths in the first beam.

Example 19 includes the subject matter of Example 18, where the optical amplifier includes a corresponding plurality of amplifier stages, and the amplifying of the first beam includes amplifying, at each amplifier stage, a respective one of the seed wavelengths in the first beam.

Example 20 is a multiwavelength laser source including: a plurality of pump fiber lasers to generate a corresponding plurality of pump laser beams having a corresponding plurality of distinct pump wavelengths; a corresponding plurality of fiber channels to transmit the pump laser beams from the pump fiber lasers; a fiber laser combiner coupled to the fiber channels and configured to receive the transmitted pump laser beams and combine the transmitted pump laser beams into a single first beam; an optical amplifier to amplify all of the pump wavelengths in the first beam; and a fixed optical parametric oscillator (OPO) to convert and output the amplified first beam as a multiwavelength second beam including the pump wavelengths, a corresponding plurality of signal wavelengths, and a corresponding plurality of idler wavelengths, the signal and idler wavelengths being distinct from each other and from the pump wavelengths.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood in light of the present disclosure. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A multiwavelength laser source comprising:
    a plurality of seed lasers to generate a corresponding plurality of seed beams having a corresponding plurality of distinct seed wavelengths and at least one temporal mode;
    a laser combiner to receive and combine the seed beams into a single first beam;
    an optical amplifier to amplify the single first beam to produce an amplified first beam; and
    a fixed nonlinear converter to convert and output the amplified first beam as a multiwavelength second beam by
        receiving the amplified first beam including the combined seed beams,
        generating at least one new wavelength distinct from the seed wavelengths, the new wavelength generated based upon the seed wavelengths and the at least one temporal mode associated with the plurality of seed beams, and
        combining the seed wavelengths and the at least one new wavelength into the multiwavelength second beam.

2. The multiwavelength laser source of claim 1, wherein the nonlinear converter comprises one or both of an optical parametric oscillator (OPO) and an optical parametric generator (OPG), and
    the one or more new wavelengths comprise a corresponding plurality of signal wavelengths and a corresponding plurality of idler wavelengths.

3. The multiwavelength laser source of claim 2, wherein the plurality of signal wavelengths and the plurality of idler wavelengths are distinct from each other and from the seed wavelengths.

4. The multiwavelength laser source of claim 1, wherein the nonlinear converter comprises one or both of a sum frequency generator (SFG) and a difference frequency generator (DFG),
    the seed wavelengths comprise two of a pump wavelength, a signal wavelength, and an idler wavelength, and
    the one or more new wavelengths comprise a remaining one of the pump wavelength, the signal wavelength, and the idler wavelength.

5. The multiwavelength laser source of claim 1, further comprising:
    a signal laser to generate a signal beam having one or more distinct signal wavelengths; and
    an optical combiner to combine the amplified first beam and the signal beam into a combined first beam, wherein
        the nonlinear converter is an optical parametric amplifier (OPA),
        the seed wavelengths comprise two or more pump wavelengths, the OPA is configured to convert and output the combined first beam as the multiwavelength second beam, and the one or more new wavelengths comprise idler wavelengths generated by the OPA.

6. The multiwavelength laser source of claim 1, further comprising a corresponding plurality of fiber channels to transmit the seed beams to the laser combiner.

7. The multiwavelength laser source of claim 1, wherein the optical amplifier comprises a plurality of amplifier stages, each of the plurality of amplifier stages being configured to amplify one or more of the seed wavelengths in the single first beam.

8. The multiwavelength laser source of claim 1, wherein the optical amplifier is further configured to amplify all of the seed wavelengths in the single first beam.

9. The multiwavelength laser source of claim 8, wherein the optical amplifier comprises a corresponding plurality of amplifier stages, each of the plurality of amplifier stages being configured to amplify a respective one of the seed wavelengths in the single first beam.

10. The multiwavelength laser source of claim 1, wherein the plurality of seed lasers comprises at least three seed lasers.

11. The multiwavelength laser source of claim 1, where the at least one temporal mode comprises at least one of a multiplexed mode, a time-sequenced mode, an interleaved mode, and a simultaneous mode.

12. A method of driving a multiwavelength laser source, the method comprising:
generating, from a plurality of seed lasers, a corresponding plurality of seed beams having a corresponding plurality of distinct seed wavelengths and at least one temporal mode;
receiving, at a laser combiner, the seed beams from the seed lasers;
combining, at the laser combiner, the received seed beams into a single first beam;
amplifying, with an optical amplifier, the single first beam to produce an amplified first beam;
converting, with a fixed nonlinear converter, the amplified first beam into a multiwavelength second beam, wherein converting the amplified first beam comprises
receiving the amplified first beam including the combined seed beams,
generating at least one new wavelength distinct from the seed wavelengths, the new wavelength generated based upon the seed wavelengths and the at least one temporal mode associated with the plurality of seed beams, and
combining the seed wavelengths and the at least one new wavelength into the multiwavelength second beam;
outputting, by the nonlinear converter, the multiwavelength second beam.

13. The method of claim 12, wherein
the nonlinear converter is an optical parametric oscillator (OPO) or an optical parametric generator (OPG), and
the one or more new wavelengths comprise a corresponding plurality of signal wavelengths and a corresponding plurality of idler wavelengths.

14. The method of claim 13, wherein the plurality of signal wavelengths and the plurality of idler wavelengths are distinct from each other and from the seed wavelengths.

15. The method of claim 12, wherein
the nonlinear converter is a sum frequency generator (SFG) or a difference frequency generator (DFG),
the seed wavelengths comprise two of a pump wavelength, a signal wavelength, and an idler wavelength, and
the one or more new wavelengths comprise a remaining one of the pump wavelength, the signal wavelength, and the idler wavelength.

16. The method of claim 12, further comprising:
generating, from a signal laser, a signal beam having one or more distinct signal wavelengths; and
combining, with an optical combiner, the amplified first beam and the signal beam into a combined first beam, wherein
the nonlinear converter is an optical parametric amplifier (OPA),
the seed wavelengths comprise two or more pump wavelengths,
the converting of the amplified first beam comprises converting the combined first beam into the multiwavelength second beam, and
the one or more new wavelengths comprise idler wavelengths generated by the OPA.

17. The method of claim 12, further comprising transmitting, over a corresponding plurality of fiber channels, the seed beams to the laser combiner.

18. The method of claim 12, wherein
the optical amplifier comprises a plurality of amplifier stages, and
the amplifying of the first beam comprises amplifying, at each amplifier stage, one or more of the seed wavelengths in the first beam.

19. The method of claim 12, wherein the amplifying of the first beam comprises amplifying all of the seed wavelengths in the first beam.

20. The method of claim 19, wherein
the optical amplifier comprises a corresponding plurality of amplifier stages, and
the amplifying of the first beam comprises amplifying, at each amplifier stage, a respective one of the seed wavelengths in the first beam.

21. A multiwavelength laser source comprising:
a plurality of pump fiber lasers to generate a corresponding plurality of pump laser beams having a corresponding plurality of distinct pump wavelengths and at least one temporal mode;
a corresponding plurality of fiber channels to transmit the pump laser beams from the pump fiber lasers;
a fiber laser combiner coupled to the fiber channels and configured to receive the transmitted pump laser beams and combine the transmitted pump laser beams into a single first beam;
an optical amplifier to amplify all of the pump wavelengths in the single first beam to produce an amplified first beam; and
a fixed optical parametric oscillator (OPO) to convert and output the amplified first beam as a multiwavelength second beam including the pump wavelengths, a corresponding plurality of signal wavelengths, and a corresponding plurality of idler wavelengths, the plurality of idler wavelengths generated based upon the pump wavelengths and the at least one temporal mode associated with the pump laser beams, the signal and idler wavelengths being distinct from each other and from the pump wavelengths.

* * * * *